United States Patent [19]

Marx et al.

[11] Patent Number: 5,379,969

[45] Date of Patent: Jan. 10, 1995

[54] HYDRAULIC ACTUATOR WITH MECHANICAL LOCK AND INSTALLATION

[75] Inventors: Alan D. Marx, Seattle; Michael E. Renzelmann, Woodinville; Mark H. Smith, Vashon Island, all of Wash.

[73] Assignee: The Boeing Company, Seattle, Wash.

[21] Appl. No.: 45,901

[22] Filed: Apr. 12, 1993

Related U.S. Application Data

[63] Continuation-in-part of Ser. No. 828,308, Jan. 30, 1992, Pat. No. 5,201,479.

[51] Int. Cl.6 .................................................. B64C 3/56
[52] U.S. Cl. ................................... 244/49; 92/23; 292/302; 292/335
[58] Field of Search .............. 244/218, 49, 120, 124, 244/102.56; 292/335, 144, 302; 92/14, 16, 20, 23, 24, 29; 116/124; 280/419

[56] References Cited

U.S. PATENT DOCUMENTS

| | | | |
|---|---|---|---|
| 3,320,861 | 5/1967 | Johnson et al. | 92/14 |
| 3,584,544 | 6/1971 | Haberman | 92/24 |
| 3,812,766 | 5/1974 | Weiss | 92/14 |
| 4,167,891 | 9/1979 | Kamimura | 92/24 |
| 4,392,556 | 7/1983 | Deutch | 92/23 |
| 4,470,340 | 9/1984 | Goans | 92/29 |
| 4,712,471 | 12/1987 | Johnson | 92/24 |
| 4,784,044 | 11/1988 | Klement | 92/23 |
| 5,025,708 | 6/1991 | Smith et al. | 92/23 |
| 5,056,418 | 10/1991 | Granger et al. | 92/24 |
| 5,081,910 | 1/1992 | D'Asoenzo, Jr. | 92/20 |
| 5,097,748 | 3/1992 | Koch et al. | 92/16 |
| 5,176,227 | 1/1993 | Kohler | 188/59 |

*Primary Examiner*—Galen L. Barefoot
*Attorney, Agent, or Firm*—Delbert J. Barnard

[57] ABSTRACT

A plurality of radially extendable/retractable lock bolts (LB) are carried by a piston head (PH). A cylinder body (CB) in which the piston head (PH) is located includes a lock-bolt cavity (52) or cavities. When the actuator is in a lock position (fully extended or fully retracted), the lock bolt or bolts (LB) are in radial alignment with the lock bolt cavity or cavities. A locking piston (LP) within the actuator is movable axially to place a bolt block (62) radially inwardly of the lock bolt or bolts (LB), to in such position block the lock bolt or bolts (LB) against a radial inward movement out from the lock bolt cavity (52) or cavities. The locking piston (LP) includes a piston face (60) against which hydraulic fluid pressure may be directed, to move the locking piston (LP) axially, for retracting the bolt block (62) out from its position radially inwardly of the lock bolt or bolts (LB). This frees the lock bolt or bolts (LB) so that they can move radially inwardly, out from the lock bolt cavity 52 or cavities.

66 Claims, 11 Drawing Sheets

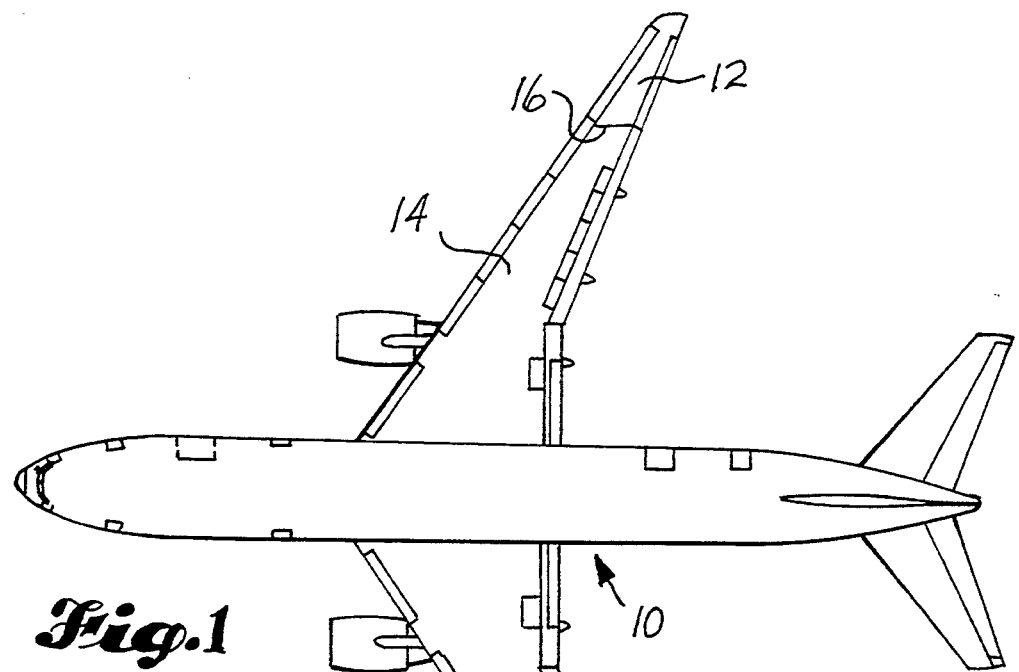
Fig.1
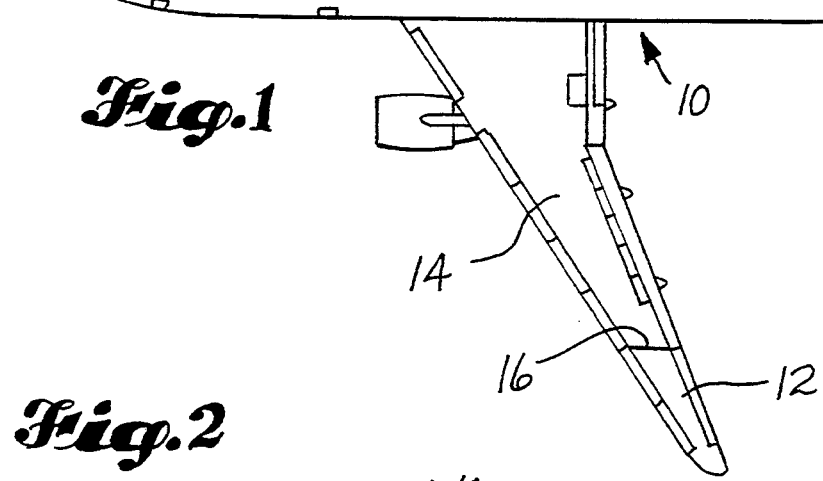
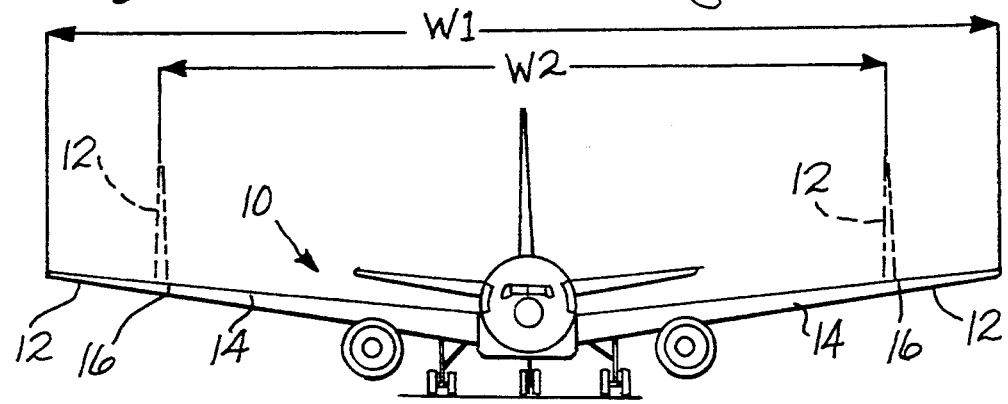
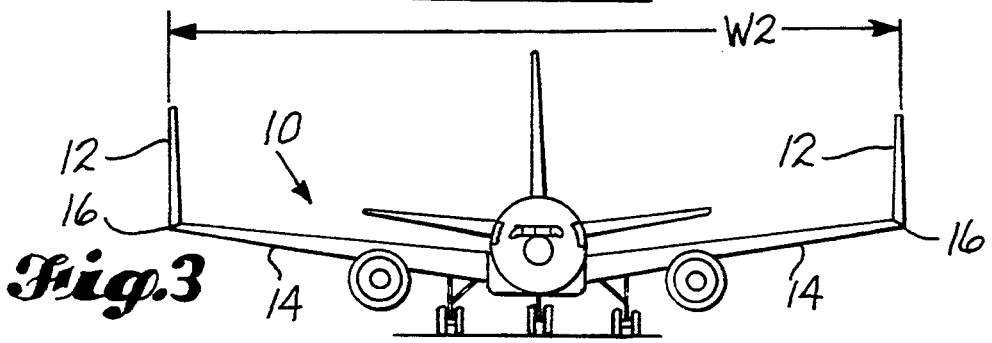
Fig.3

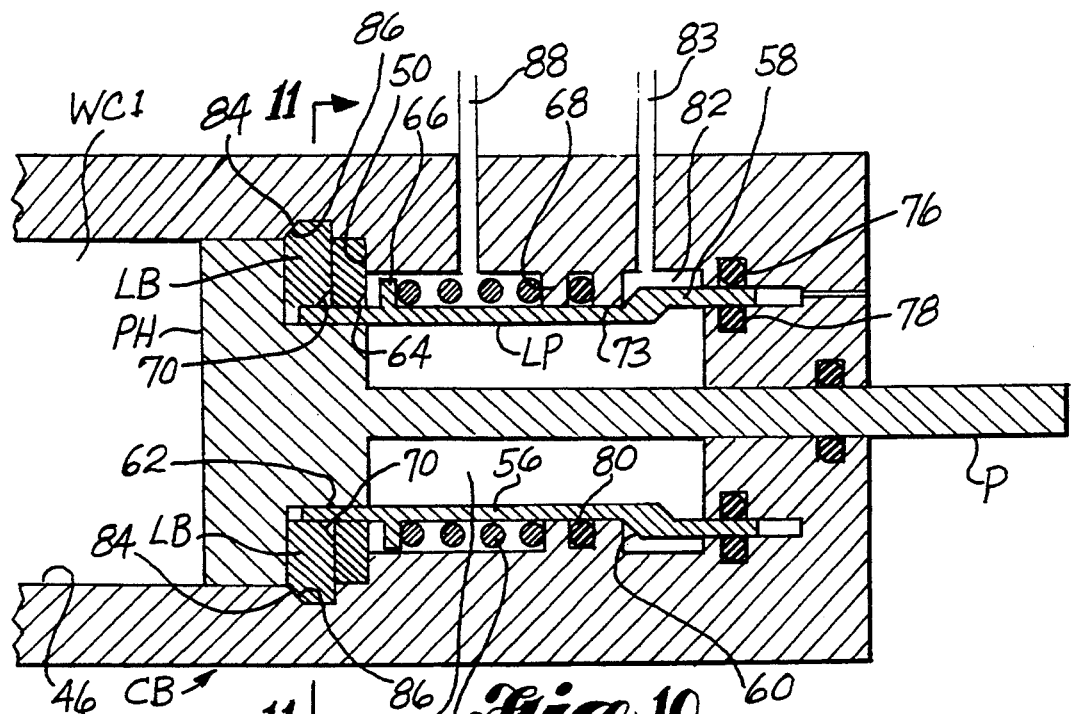
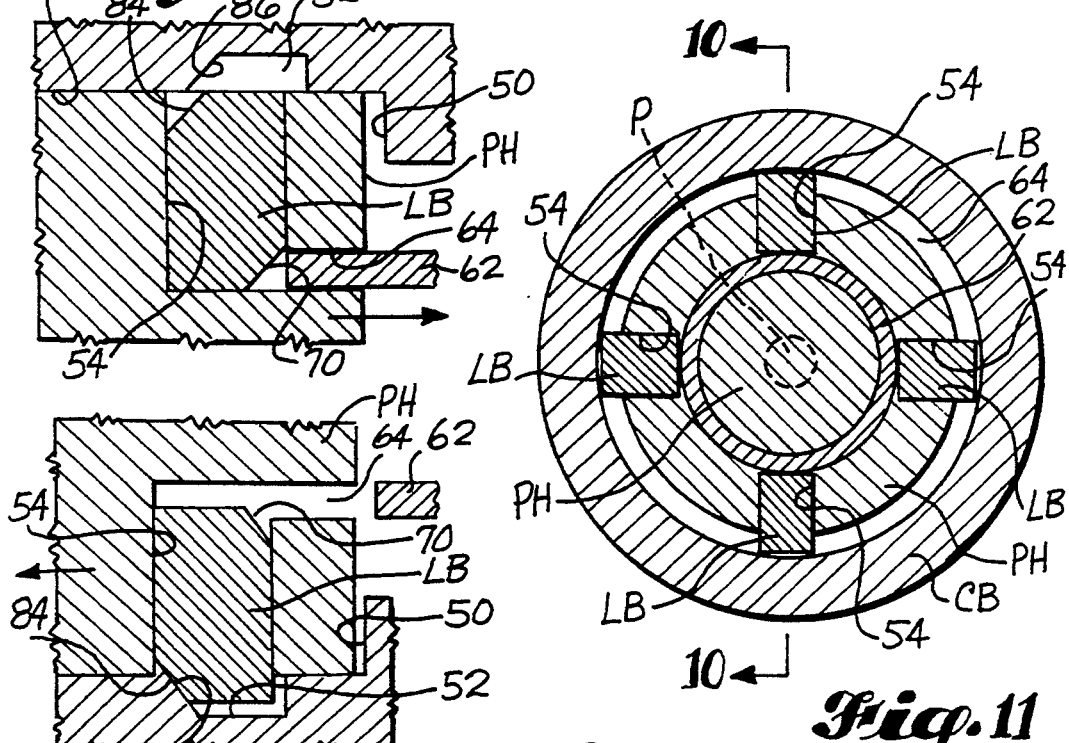

HYDRAULIC ACTUATOR WITH MECHANICAL LOCK AND INSTALLATION

RELATED APPLICATION

This application is a continuation-in-part of application Ser. No. 07/828,308, filed Jan. 30, 1992, now U.S. Pat. No. 5,201,479, issued Apr. 13, 1993.

TECHNICAL FIELD

The present invention relates to linear hydraulic actuators, also termed linear hydraulic motors. More particularly, it relates to the provision of an improved lock mechanism for such an actuator, for mechanically locking the actuator in either a fully retracted or a fully extended position. The invention also relates to an aircraft installation in which the actuators are used for moving outboard tip portions of the aircraft wings between spread and folded positions.

BACKGROUND OF THE INVENTION

The present invention was made during the development of a hydraulic actuator for moving outboard portions of airplane wings between spread and folded positions relative to inboard portions of the wings. However, the invention has uses in other actuators as well, such as, for example, actuators used in airplane thrust reverser systems.

It is known to provide hydraulic actuators with internal locking mechanisms for mechanically locking the actuators in either a fully extended or a fully retracted position. In known actuators which include a locking mechanism, there are loads on the actuators which also load the lock mechanism. In these actuators, the load acting on the lock mechanism during unlocking results in wear and a reduced life for the lock mechanism. It is therefore desirable to unload the lock mechanism from both internal and external loads before unlocking.

A principal object of the invention is to provide a lock mechanism for a hydraulic actuator which can be unloaded before being operated to unlock the actuator.

In known actuators having lock mechanisms, the lock mechanism is released by application of hydraulic pressure into a working chamber of the actuator. Inadvertent application of pressure will both unlock and deploy the actuator. In many installations it is desirable to prevent inadvertent deployment. Accordingly, an important object of this invention is to provide a lock mechanism for a hydraulic actuator which cannot be deployed by inadvertent pressure introduction into a working chamber.

In thrust reverser systems, it is known to prevent inadvertent deployment by use of electric or hydraulic powered locks which are relatively heavy, relatively expensive and not completely reliable. Another object of the present invention is to provide a hydraulically controlled lock mechanism which is believed to be lighter, less expensive and more reliable than the known electric and hydraulic mechanisms.

Actuators in the patent literature, including some type of lock mechanism, are disclosed by the following U.S. patents: U.S. Pat. No. 3,320,861, granted May 23, 1967 to Harry J. Johnson and Marvin J. Hiemstra; U.S. Pat. No. 3,584,544, granted Jun. 15, 1971 to Robert W. Haberman; U.S. Pat. No. 3,812,766, granted May 28, 1974, to Dieter Weiss; U.S. Pat. No. 4,470,340, granted Sep. 11, 1984, to Kip B. Goans and Neil H. Akkerman; U.S. Pat. No. 4,712,471, granted Dec. 15, 1987, to D. Dale Johnson; U.S. Pat. No. 5,056,418, granted Oct. 15, 1991 to Stanley W. Granger, Joseph O. Beard and Frode Sveen; U.S. Pat. No. 5,081,910, granted Jan. 21, 1992, to Frank D'Ascenzo, Jr.; U.S. Pat. No. 5,097,748, granted Mar. 24, 1992, to Georg Koch, Wolfgang Traupe, Frank van de Poel, Kurt Schaible, and Holger Seel; and U.S. Pat. No. 5,176,227, granted Jan. 5, 1993 to William H. Kohler.

SUMMARY OF THE INVENTION

A known type of hydraulic actuator with which the present invention may be used is basically characterized by an elongated cylinder body including a sidewall and endwalls together defining an interior space, and a piston including a piston head located within said interior space. The piston head divides the interior space into two working chambers, one on each side of the piston head. According the invention, the actuator is provided with a releasable lock for locking the piston in position relative to the cylinder body, e.g. when the actuator is either fully extended or fully retracted. The releasable lock is basically characterized by at least one radially extendible/retractable lock bolt carried by the piston head, a complementary lock-bolt cavity within the cylinder body, and a locking piston including a bolt block. The lock bolt is normally freed for radial retraction. The actuator includes a lock position in which it is desired to lock the piston to the cylinder body. When the actuator is in such lock position, the lock bolt is extendible radially outwardly into the lock bolt cavity. Also, the locking piston is movable axially of the actuator to place the bolt block radially inwardly of the lock bolt, to in such position block the lock bolt against a radial inward movement out from the lock bolt cavity.

According to an aspect of the invention, the locking piston includes a piston face against which hydraulic fluid may be directed, for moving the locking piston axially to retract the bolt block out from its position radially inwardly of the lock bolt. This frees the lock bolt, allowing it to move radially inwardly, out from the lock-bolt cavity.

In preferred form, the lock mechanism includes a plurality (e.g. four or six) of lock bolts distributed circumferentially about the piston head. Each lock bolt is extendible radially into and retractable radially out from a lock-bolt cavity that is a part of the cylinder body. A single annular lock bolt cavity may be provided, into which all of the lock bolts are extendible. Or, separate lock bolt cavities may be provided, one for each lock bolt.

In preferred form, a bias spring is provided for biasing the locking piston into a first position. When the actuator is in its lock position, the bias spring biases the locking piston into a position placing the bolt block radially inwardly of the lock bolt or bolts.

According to an aspect of the invention, each lock bolt includes an extend cam positioned to be contacted by the bolt block in response to the locking piston and the piston head being moved relatively together. In response to such movement and contact, the extend cam is adapted to cam the lock bolt radially outwardly into the lock bolt cavity. Further axial movement of the locking piston moves the bolt block into a position radially inwardly of the lock bolt or bolts.

According to another aspect of the invention, each lock bolt has a retract cam positioned to cam the lock bolt radially inwardly, out from the lock bolt cavity, in response to an axial movement of the piston head relative to the cylinder body, following a retraction of the bolt block out from its position radially inwardly of the lock bolt.

In preferred form, the bolt block is an annular first end portion of the locking piston. The piston head includes a complementary annular passageway confronting the bolt block. Relative movement of the bolt block into this annular passageway moves the bolt block into its position radially inwardly of the lock bolt or bolts. In preferred form, the locking piston includes a generally annular second end portion. The cylinder body includes a working chamber endwall with a complementary annular second passageway in which the annular second end portion of the locking piston is received. The actuator includes a seal between the second passageway and the annular second end portion of the locking piston.

According to an aspect of the invention, the cylinder body includes a shoulder which is contacted by the piston head when the actuator is in its locked position, i.e. either fully extended or fully retracted. The lock bolt is substantially unloaded when the piston head is against the shoulder. This enables the bolt block to be retracted out from its position radially inwardly of the lock bolt or bolts, when the lock bolt is unloaded.

Another object of the present invention is to provide folding wing aircraft with an actuator of the type described and to use such actuator to move outboard tip portions of the wings between spread and folded positions relative to inboard portions of the wings. The lock mechanism is used to lock the outboard tip portions in a spread position.

Other objects, features and advantages of the invention are set forth below in the detailed description of the preferred embodiment.

BRIEF DESCRIPTION OF THE DRAWINGS

In the drawings, like reference numerals and letters are used to designate like parts throughout the several views, and:

FIG. 1 is a top plan view of a commercial airplane having wings with outboard end portions foldable upwardly, so as to decrease the width of the airplane at the wing, such view showing the outboard end portions of the wing in an extended or in-use position;

FIG. 2 is a front elevational view of the airplane shown in FIG. 1, with the outboard portions of the wing shown by solid lines in an extended or in-use position, and by broken lines in a folded position;

FIG. 3 is a view like FIG. 2, but showing in solid line the outboard end portions of the wings in their folded position;

FIG. 10 is a view like FIG. 8, but showing the actuator in its locked position;

FIG. 11 is a cross-sectional view taken substantially along line 11—11 of FIG. 10;

FIG. 12 is an enlarged fragmentary view in the region of a lock bolt, showing the lock bolt being cammed outwardly;

FIG. 13 is a view similar to FIG. 12, but of a lower lock bolt, showing the lock bolt being cammed inwardly;

BEST MODE FOR CARRYING OUT THE INVENTION

The present invention is illustrated and described as being a part of an actuator that was developed for use to move outboard portions of airplane wings between spread and folded positions relative to inboard portions of the wings. The structure shown in FIGS. 1-7 is disclosed and described in U.S. application Ser. No. 07/828,308, entitled Self-Monitoring Latch Pin Lock for Folding Wing Aircraft, filed Jan. 30, 1992 by Michael E. Renzelmann, and assigned to The Boeing Company of Seattle, Wash.

Referring to FIGS. 1-3, the airplane 10 is a commercial jet airliner having outboard wing portions 12 which are adapted to fold upwardly from inboard wing portions 14. FIGS. 1 and 2 include solid line showings of the outboard wing portions 12 in what is herein referred to as the "spread" position. This is the "in use" position of the wings in which outboard wing portions 12 are outboard continuations of the inboard wing portions 14. FIG. 2 includes a broken line showing of the wing portions 12 in a folded position. FIG. 3 includes a solid line showing of the wing portions 12 in a folded position. When the wings are in their spread position, the wing tip to wing tip dimension is W1. When the wings are in their folded position, the wing tip to wing tip dimension is reduced down to dimension W2. This reduction in the airplane width, measured at the wings, enables the airplane to taxi and park within a smaller space at the airport. The folding wing concept will permit the construction of larger airplanes than are in use today and will allow such larger airplanes to be loaded and unloaded at airport terminals sized for handling smaller airplanes. Or, the folding wing concept can be used on smaller airplanes, and terminals for such airplanes can be built closer together than would be the case if the wings were not capable of being folded.

Figure 6:
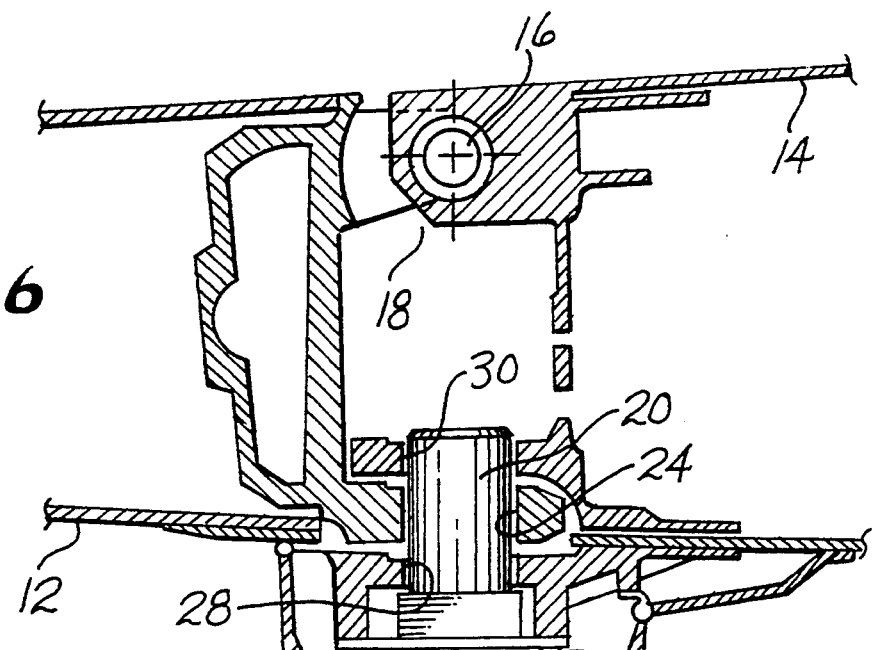
FIG. 6 is a fragmentary sectional view taken across the fold axis, showing a part of a locking mechanism that is provided for locking the wing into its extended position, such mechanism including a plurality of lock pins, one of which is shown in its extended or lock position.
Figure 7:
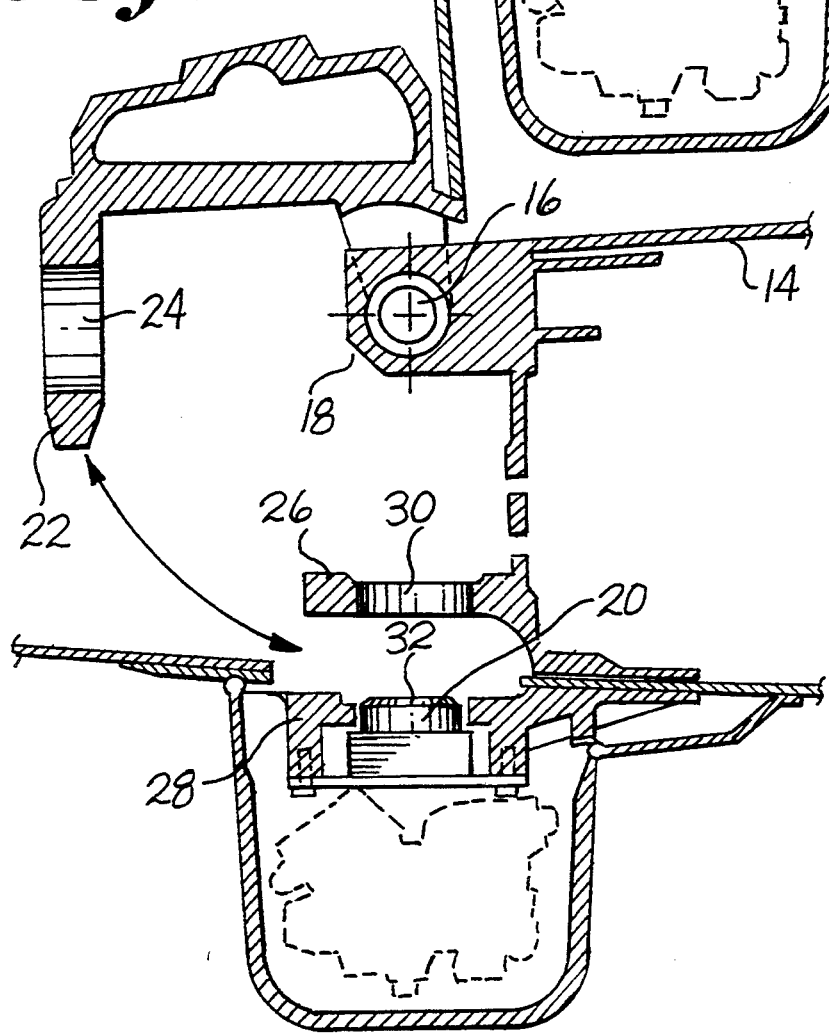
FIG. 7 is a view like FIG. 6, but showing the outboard end portion of the wing in a folded position.

The outboard wing portions 12 fold upwardly and downwardly about hinge lines 16. The hinge structure 18 is not a part of the present invention. The hinge structure and lock mechanism for locking the wings into the spread position is disclosed in the aforementioned copending U.S. application Ser. No. 07/828,308. This lock mechanism comprises a plurality of extendable/retractable lock pins 20. As shown by FIGS. 6 and 7, each outboard wing portion 12 carries a member 22 which includes a plurality of openings 24, one for each pin 20. When the wing is in the spread position, member 22 is positioned between members 26, 28 which are a part of the inboard wing portion 14. Openings 24 are in alignment with openings 30 in member 26 and openings 32 in member 28. When the lock pins 20 are retracted, each pin 20 is located within an opening 32, below the upper surface of member 28. This allows member 22 to be swung into or out from a position between members 26 and 28. When member 22 is between members 26 and 28, and openings 24, 30, 32 are in alignment and the lock pins 20 are extendable into the position shown by FIG. 6. The lock pins 20, when in this position, secure the outboard and inboard portions 12, 14 of the wings together in the spread position.

Figure 4:
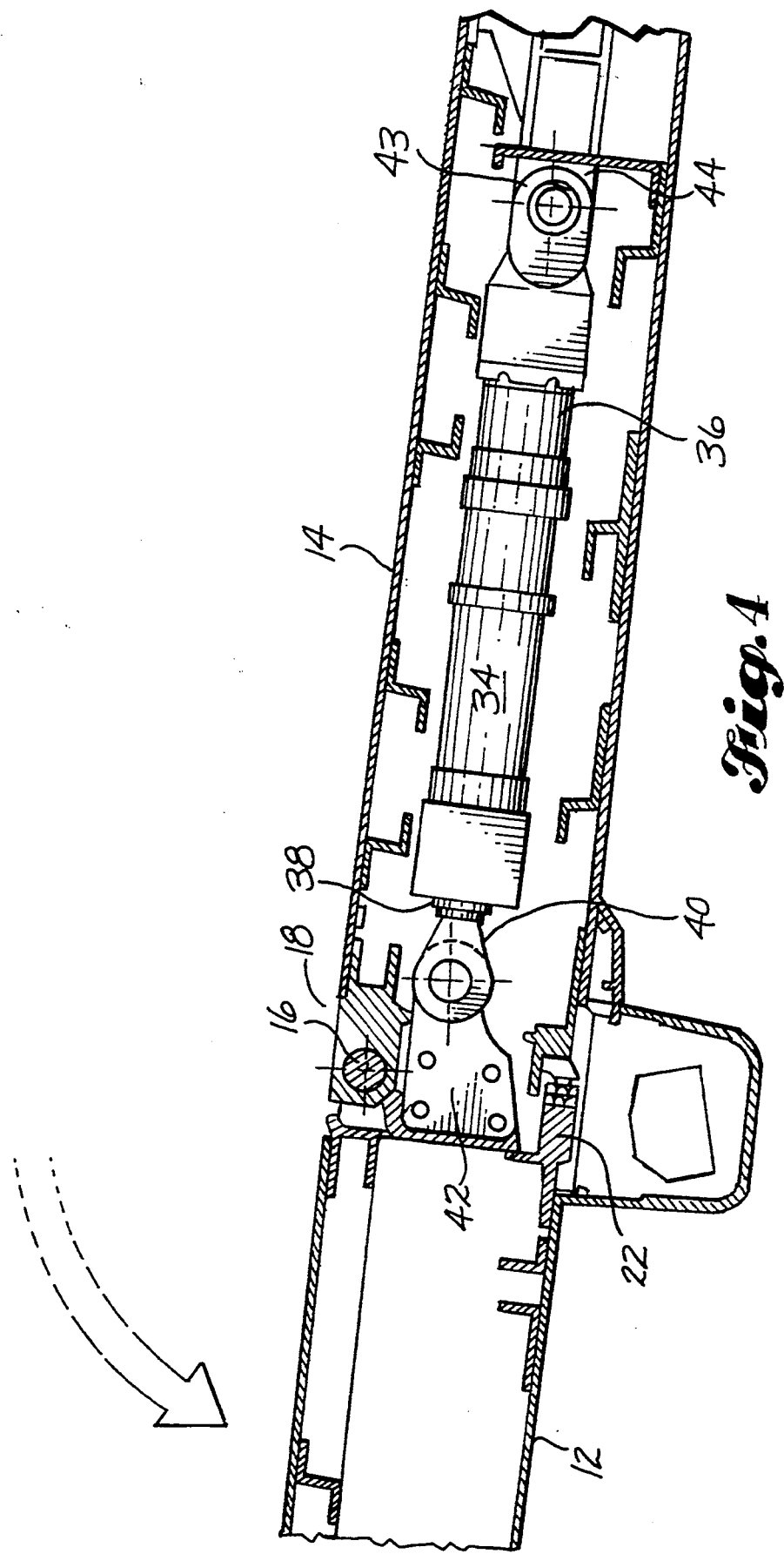
FIG. 4 is a fragmentary longitudinal sectional view taken through an airplane wing in the vicinity of a fold axis, such view showing the wing in an extended position and a fold/extend actuator in a retracted position.
Figure 5:
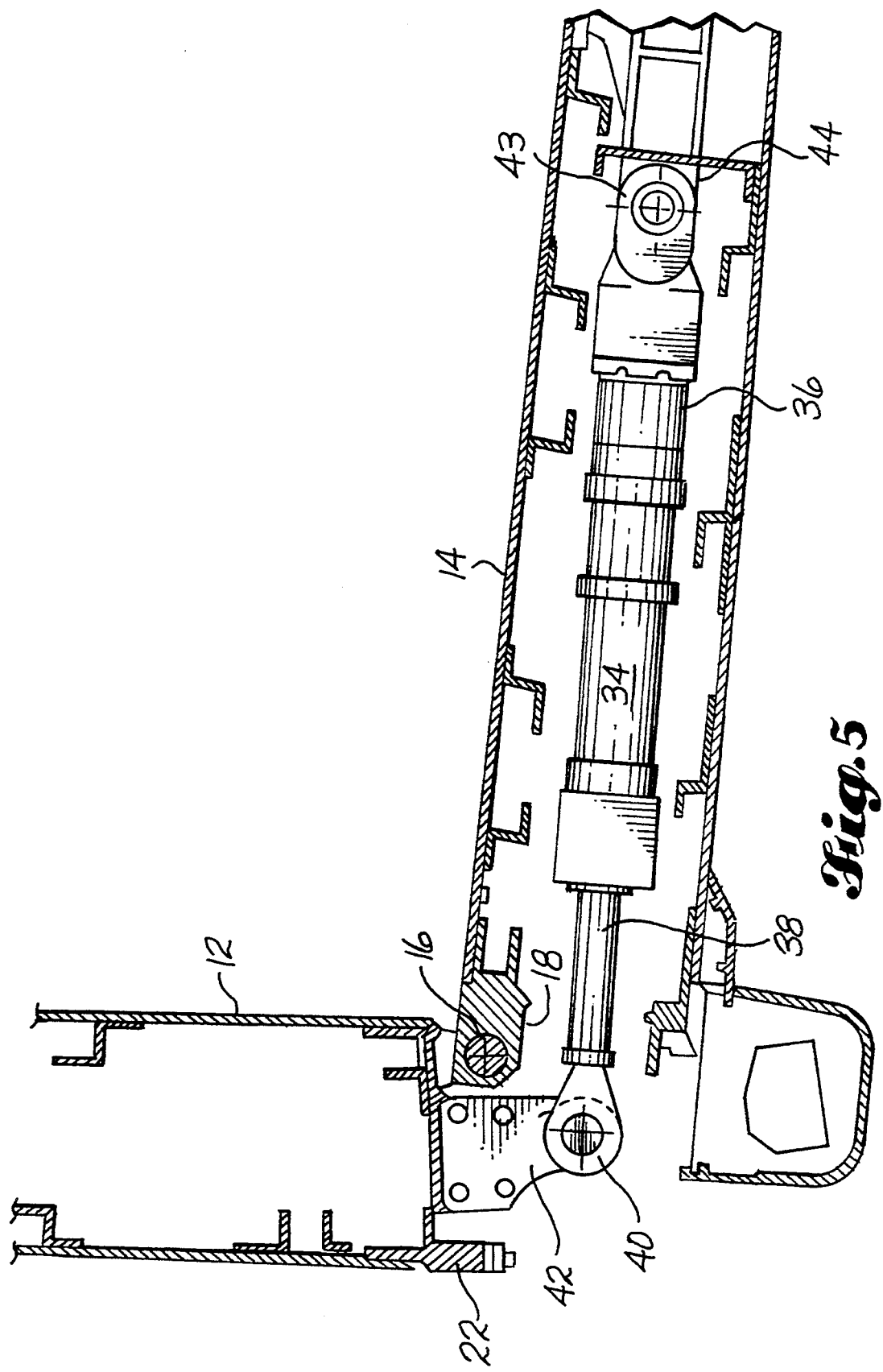
FIG. 5 is a view like FIG. 4, but showing the fold/extend actuator in an extended position and the outboard end portion of the wing in a folded position.

Referring to FIGS. 4 and 5, the outboard wing portions 12 are moved between spread and folded positions, relative to the inboard wing portions 14, by hydraulic actuators 34, one for each wing. In preferred form, each actuator 34 is a tandem actuator comprising a fixed portion and a movable portion. In the disclosed embodiment, the fixed portion 36 is an elongated cylinder housing. The movable portion 38 is an elongated piston rod and, as will be hereinafter described, two spaced apart piston heads within the cylinder housing 36. In a conventional manner, the outer end of piston rod 38 is pivotally connected at 40 to a lever 42 that is connected to outboard wing portion 12. At the opposite end of the actuator 34, the cylinder housing 36 is pivotally connected at 43 to a frame portion 44 of the inboard wing portion 14. As shown by FIG. 4, retraction of the piston 38 into the cylinder housing 36 pulls on the lever 42 and swings the outboard wing portion 12 about fold axis 16. This swings the outboard wing portion 12 downwardly from its folded position into its spread position (FIG. 4). Extension of piston rod 38 out from cylinder housing 36 pushes on the lever 42 and swings the outboard wing portion 12 upwardly, about the fold axis 16. In this manner the outboard wing portion 12 is moved from its spread position (FIG. 4) up into its folded position (FIG. 5).

Figure 8:
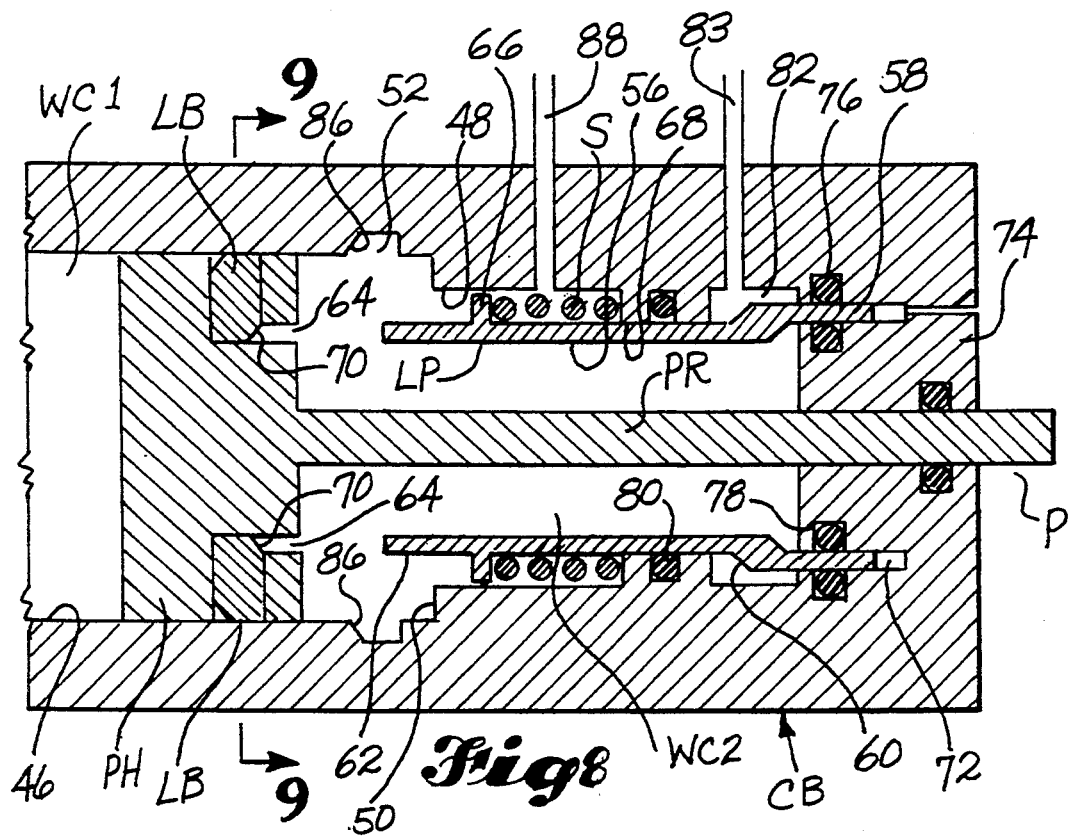
FIG. 8 is a diagrammatic longitudinal sectional view taken substantially along line 8—8 of FIG. 9, showing the fold/extend actuator in an unlocked position.
Figure 9:
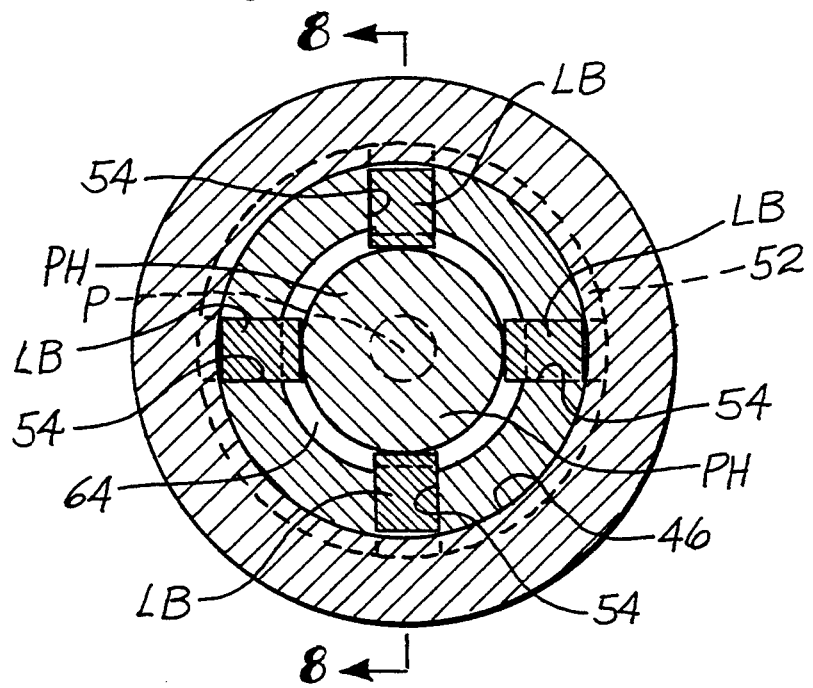
FIG. 9 is a cross-sectional view taken substantially along line 9—9 of FIG. 8, such view by solid line showing lock bolts in a retracted position, and by a broken line showing the lock bolts in an extended position.
Figure 14:
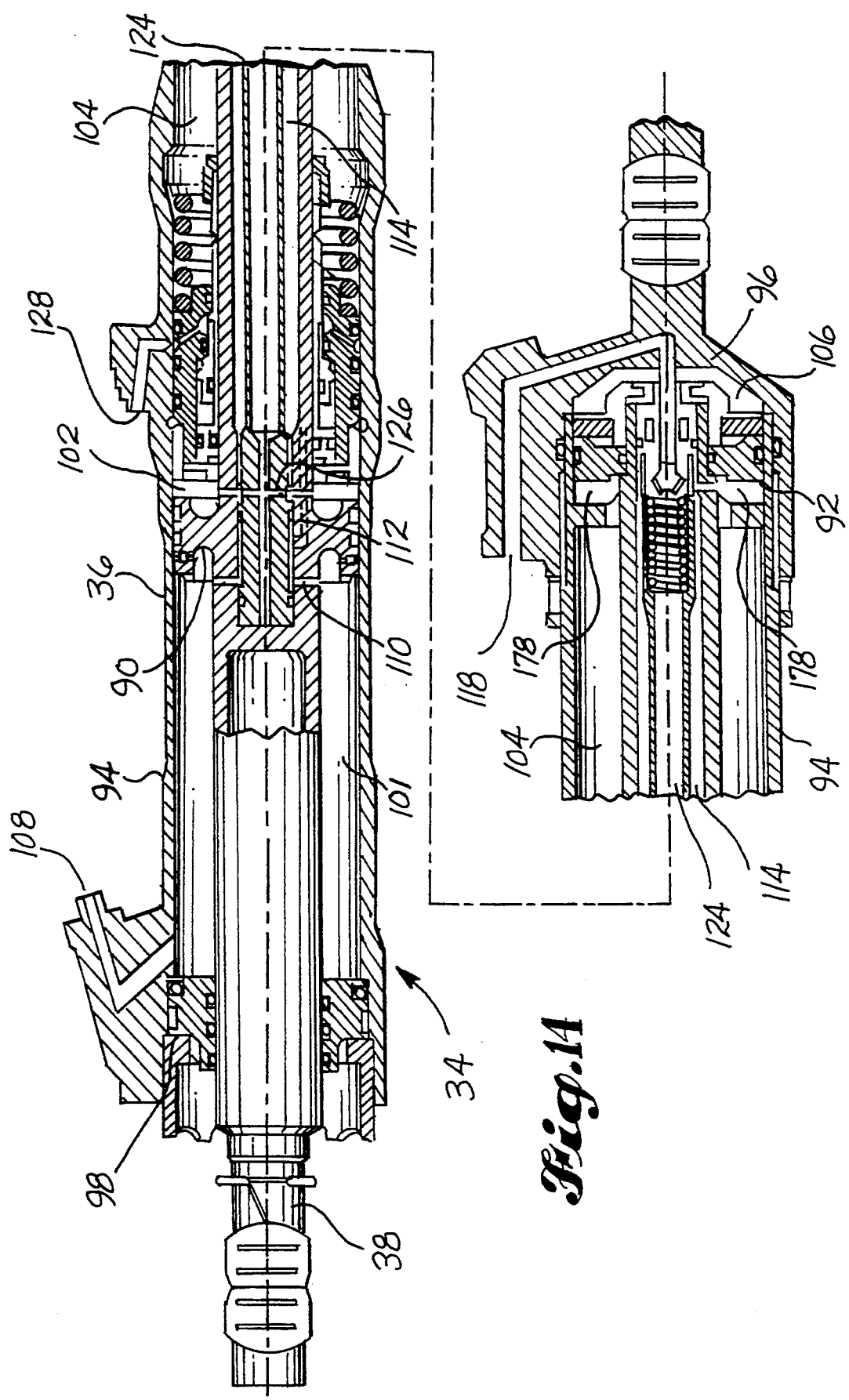
FIG. 14 is a two part longitudinal sectional view of a preferred embodiment of a fold/extend actuator.

FIGS. 8-11 are structural diagrams of an actuator which includes a lock mechanism constructed according to the present invention. In these figures, the actuator is shown to include a cylinder body CB and a piston P. Piston P includes an elongated piston rod PR and a piston head PH. Cylinder body CB is elongated and includes an interior space. The piston head PH divides the interior space into two working chambers WC1, WC2. Cylinder body CB is axially elongated. FIGS. 8 and 9 show an end portion of the cylinder body CB. The opposite end portion, which includes most of working chamber WC1, is not shown. Cylinder body CB includes a cylindrical sidewall 46 and a reduced diameter end portion 48. A radial shoulder 50 is formed where sidewall 46 meets reduced diameter portion 48. In preferred form, an annular lock-bolt cavity 52 is formed in the sidewall 46, closely adjacent shoulder 50. Also in preferred form, piston head PH is provided with a plurality of circumferentially spaced apart lock bolts LB. In the illustrated example, four lock bolts LB are shown. In some installations it may be desirable to have as many as six lock bolts LB. However, the invention is not dependent on any particular number of lock bolts LB. At least one lock bolt LB is required. A plurality of lock bolts LB is preferred. It is preferred that the lock bolts LB be evenly spaced about the circumference of the cylinder body CB.

As shown by FIG. 10, when piston head PH is against shoulder 50, the lock bolts LB are in radial alignment with the lock bolt cavity 52. A single lock-bolt cavity 52 is illustrated. However, the single lock-bolt cavity 52 may be replaced by a plurality of lock bolt cavities (not shown), one for each lock bolt LB.

Herein the term "lock bolt" is used in the same way that the term is used in lock technology. That is, it is a metal bar or rod in the mechanism of a lock. As shown by FIGS. 8-11, each lock bolt LB is located within a radial socket 54 in the piston head PH. When the lock bolts LB are retracted into the sockets 54, the outer ends of the lock bolts LB are at or slightly inwardly of the sidewall 46 (FIGS. 8 and 9). When the actuator is in its "lock" position, the lock bolts LB are extendable radially outwardly into the lock bolt cavity 52 (or cavities).

The releasable lock of the invention includes a locking piston LP. In preferred form, lock piston LP is tubular and includes a main body portion 56, an enlarged diameter end portion 58 and a piston face 60. Lock piston LP also includes an annular end portion 62 which is herein termed a "bolt block." Piston head PH includes an annular passageway 64 sized to receive the bolt block 62 (FIG. 10). Bolt block 62 and passageway 64 confront each other (FIG. 8).

In preferred form, locking piston LP includes a radial abutment 66 and cylinder body includes a radial abutment 68. A compression spring S is located between the abutments 66, 68. Spring S normally biases the locking piston LP into the position shown by FIG. 10. When the locking piston LP is in the position shown by FIG. 10, and the piston head PH is moved towards the shoulder 50, the bolt block 62 moves relatively into the passageway 64. Each lock bolt LB includes an extend cam 70 that is in alignment with passageway 64 when the lock bolt LB is retracted. Movement of piston head PH toward shoulder 50 also moves lock bolts LB into radial alignment with the lock bolt cavity(s) 52. The bolt-block 62 is moved relatively into passageway 64 and eventually contacts the extend cams 70. When this happens, the contact between the bolt block 62 and the extend cams 70 exerts a radially outwardly component of force on the lock bolts LB, "camming" them radially outwardly into the bolt cavity(s) 52. Additional movement of the piston head PH towards the shoulder 50 will result in a relative movement of the bolt block 62 into a position radially inwardly of the lock bolts LB. When piston head PH is against shoulder 50, the bolt block 62 is radially inwardly of the lock bolts LB (FIG. 10). In this position, the bolt block 62 prevents a radially inwardly movement of the lock bolts LB, out from engagement with the lock bolt cavity(s) 52. So long as the bolt block 62 is positioned radially inwardly of the lock bolts LB, the piston head PH, and thus the piston P, is mechanically locked against movement relative to the cylinder body CB.

The end portion 58 of locking piston LP fits into a annular passageway 72 that is formed in chamber endwall 74. Chamber endwall 74 may be the closed end of the cylinder body CB or may be a divider wall intermediate the length of the cylinder body CB. Annular passageway 72 confronts end portion 58. End portion 58 extends between two O-ring seals 76, 78. The O-ring seals 76, 78 seal against fluid leakage from working chamber WC2 out through the annular passageway 72. Spring abutment 68 is a radial wall which includes a central passageway 73 through which the main body portion 56 of locking piston LP extends. This wall includes an annular groove. There is an O-ring 80 within the groove which seals between the sidewall of passageway 73 and the outer surface of wall 56.

As shown by FIGS. 8 and 10, an annular chamber 82 is formed in the cylinder body CB axially between O-ring seal 80 and O-ring Seal 76, 78. This chamber 82 is located radially outwardly of the portion of locking piston LP which includes piston face 60. A fluid pressure passageway 83 is provided to deliver hydraulic pressure into chamber 82. As previously stated, spring S normally biases the locking piston LP towards the piston head PH. As will be appreciated, hydraulic pressure within chamber 82 acts on piston face 60 to produce an endwise force on the locking piston LP wanting to move it against the force of spring S. In response, locking piston LP moves into the position shown by FIG. 8.

The hydraulic pressure is introduced into chamber 82 when the actuator and the lock mechanism are in the position shown by FIG. 10. The endwise movement (to the right as pictured), caused by the hydraulic pressure acting on piston face 60, moves the bolt-block 62 out from its blocking position, viz. a position radially inwardly of the lock bolts LB. Once the bolt block 62 is out from a position radially inwardly of the lock bolts LB, the upper lock bolts LB may fall by gravity into their retracted positions. The lower lock bolts LB will be held by gravity into the lock bolt cavity 52. However, these lock bolts LB are freed for radial inward movement as there is no longer anything positioned to block or prevent a radial inward movement of these lock bolts LB.

Referring to FIGS. 8-13, each lock bolt LB has both an extend cam 70 and a retract cam 84. As previously stated, the extend cams 70 coact with the end surface of bolt block 62, to cam the lock bolts LB radially outwardly in response to a relative movement of the bolt blocks 62 against the cam surfaces 70. Retract cams 84 coact with surface 86, which is a side surface of lock bolt cavity 52, to cam the lock bolts LB radially inwardly in response to an axial movement of piston head PH, relative to the cylinder body CB, away from the "lock" position. Surface 86 is also referred to as a "cam"

As previously stated, spring S normally biases the locking piston LP into the position shown by FIG. 10. Movement of piston head PH against shoulder 50, moves the bolt block 62 relatively into bolt block passageway 64. As best shown by FIG. 12, during this movement there is contact between bolt block 62, which is stationary, and the extend cam surfaces 70 on the lock bolts LB. Piston head PH is moving relative to bolt block 62, in the direction indicated by the arrow in FIG. 12. The lock bolts LB are carried by and move with the piston head PH. This relative movement, and the contact which occurs between the end surface of bolt block 62 and the cam surfaces 70, exert a radially outwardly directed component of force on the lock bolts LB, camming or forcing them radially outwardly. Such movement of the lock bolts LB is permitted because the camming contact occurs just as the outer end portions of the lock bolts LB come into register with the lock bolt cavity 52. This is also shown in FIG. 12. As the piston head PH continues towards the shoulder 50, the continuous contact between the bolt block 62 and the cam surfaces 70, and the continuous movement of the lock bolts LB, in the axial direction, causes the radially outward movement of the lock bolts LB to continue until the bolt block 62 enters between the respective inner radial ends of the lock bolts LB and the lock bolt sockets 54. When the piston head PH is against the shoulder 50, the bolt block 62 is positioned radially inwardly of the lock bolts LB. This position is shown in FIGS. 10 and 11. When the bolt block is in this position, it fills the radial space between the radial inner ends of the lock bolts LB and the lock bolt cavities 54. The lock bolts LB are thus "blocked" against retraction out from the lock bolt cavity 52. The engagement of the lock bolts LB in the lock bolt cavity or cavities mechanically "locks" the piston head PH to the cylinder body. CB. Until this mechanical lock is released, the piston P will not move relative to the cylinder body CB, even if fluid pressure is removed from both working chambers WC1, WC2.

In FIGS. 8 and 10, the passageway for delivering hydraulic fluid pressure into working chamber WC2 is shown schematically at 88. A fluid pressure delivery passageway for working chamber WC1 is not illustrated. However, it may enter into the working chamber WC1 through the piston P or through a sidewall portion of the cylinder body CB, at a location to the left of FIGS. 8 and 10.

Referring to FIG. 10, let it be assumed that the actuator is in this position and it is desired to release or unlock the lock mechanism. Firstly, the pressure within working chamber WC1 is increased for the purpose of moving and holding the piston head PH tight against shoulder 50. The lock bolts LB, the lock bolt cavity 52 and the lock bolt sockets 54 are positioned and dimensioned so that when the piston head PH is tight against shoulder 50, the lock bolts LB carry no load, axially of the actuator. In this position, the lock bolts LB can be moved radially without having to overcome friction forces, either between surfaces of the lock bolts LB and the lock bolt cavity 52, or surfaces of the lock bolts LB and the lock bolt sockets 54. Next, while the piston head PH is held tight against shoulder 50, by fluid pressure within working chamber WC1, hydraulic pressure is introduced through passageway 83 into chamber 82. As previously described, this pressure acts on piston surface 60 and moves the locking piston LP to the right (as illustrated), thereby withdrawing the bolt block 62 from its position radially inwardly of the lock bolts LB. FIG. 13 shows the bolt block 62 removed from the region that is radially between the radial inner end of the lock bolts LB and the radial inner ends of the lock bolt cavities This frees the lock bolts LB for a radial inward movement. If the actuator is in a generally horizontal position, the upper lock bolts LB may, under the force of gravity, drop radially inwardly into their lock bolt cavities 54. Or, they may stick and have to be cammed inwardly, in a manner to be described. The force of gravity will maintain the lower lock bolts LB extended until they are forced radially inwardly. Following retraction of the bolt block 62, by introduction of hydraulic fluid pressure into chamber 82, the hydraulic pressure is released from working chamber WC1 and introduced into working chamber WC2. As will be appreciated, a higher pressure in working chamber WC2, than in working chamber WC1, will make the piston P and piston head PH want to move to the left (as illustrated). Owing to the presence of cam surfaces 84, 86, this movement is not prevented by the lock bolts LB. Referring to FIG. 13, as the piston head PH starts to move in the direction indicated by the arrow in this figure, the contact between cam surfaces 84, 86 cams or forces the lock bolts LB radially inwardly into the lock bolt sockets 54. The lock bolts LB bottom out within the lock bolt cavities 54 substantially when the outer end surfaces of the lock bolts LB move radially inwardly clear of side surface 46 of working chamber WC1. Additional introduction of fluid pressure into working chamber WC2, while working chamber WC1 is connected to return, will result in the piston P and piston head PH continuing to move to the left (as illustrated).

Figure 18:
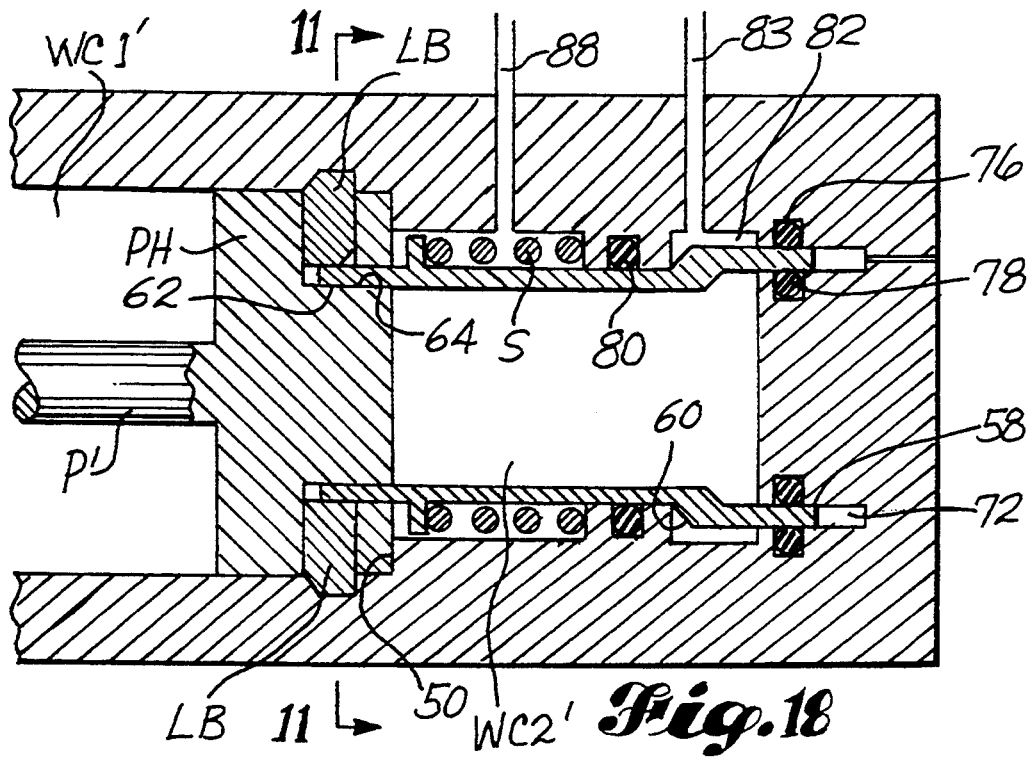
FIG. 18 is a view like FIG. 10, but of an actuator that is adapted to be locked in a retracted position, said view showing the actuator locked.
Figure 19:
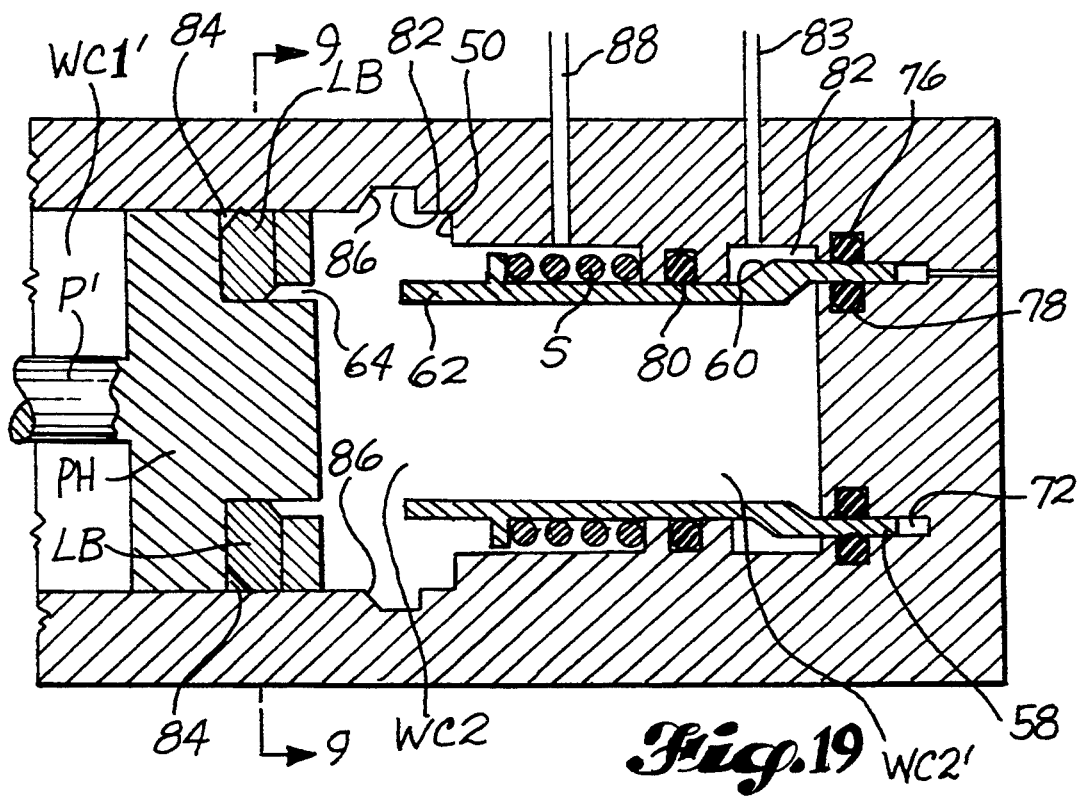
FIG. 19 is a view like FIG. 8, but of the actuator shown by FIG. 18, said view showing the actuator unlocked and the piston head spaced from the locking piston.

FIGS. 8-10 show an actuator that is constructed to be locked into a fully extended position. FIGS. 18 and 19 are like FIGS. 8 and 10, except they show an actuator that is adapted to be locked into a fully retracted position. As will be noted, in FIGS. 18 and 19, the piston is designated P′. The working chambers are designated WC1′ and WC2′. The piston rod PR′ extends from the piston head PH in a direction opposite from what is illustrated in FIGS. 8 and 10. In other respects, there has been no change to the structure. For this reason, the lock mechanism will not be described again in connection with FIGS. 18 and 19.

FIGS. 14-17 disclose a best mode of actuator 34 FIGS. 4 and 5). The actuator 34 itself is based on conventional design for a tandem actuator. However, the lock mechanism, the piston head, and the internal divider wall are unique.

In FIGS. 14-17, the piston rod is designated 38. There are two piston heads. They are designated 90, 92, respectively. The cylinder body is designated 94. The endwall at the closed end of the cylinder body is designated 96. The cylinder head at the opposite end of the cylinder body 94 is designated 98. The divider wall between the two ends of the cylinder body 94 is designated 100. Actuator 34 has four working chambers. They are designated 101, 102, 104 and 106. Actuator 34 includes a first inlet/outlet port 108 which communicates directly with working chamber 101 and indirectly with working chamber 104 via passageways 110, 112, 114 and 116, formed in the piston rod 38. Actuator 34 includes a second inlet/outlet port 118 that is directly connected to working chamber 106 and is indirectly connected to working chamber 102 via passageways 120, 122, 124, 126. Actuator 34 is provided with a third port 128 which provides hydraulic fluid pressure for unlocking the look mechanism, in a manner which is described below.

Figure 15:
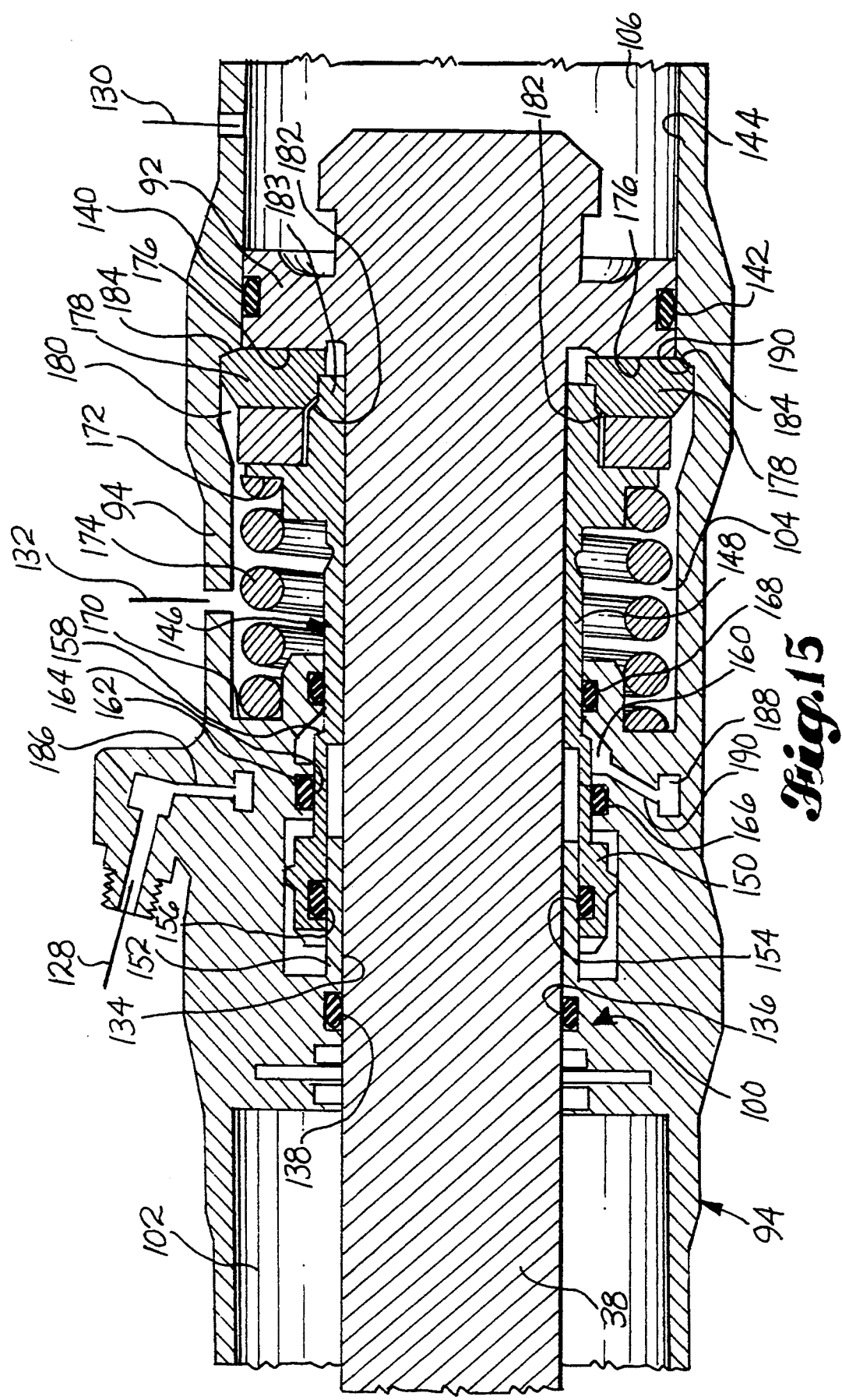
FIG. 15 is an enlarged scale fragmentary, partially schematic view of the actuator shown in FIG. 14, taken in the vicinity of the lock mechanism, such view showing the actuator locked into an extended position.

FIG. 15 is limited to the essential components of the lock mechanism that is a part of the preferred embodiment. It is believed that this view will make it easier to understand the invention as it is applied to the preferred embodiment. In the preferred embodiment, the divider wall 100 is comparable to the endwall 74 shown in FIGS. 8 and 9. Divider wall 100 is an endwall for working chamber 104. Working chambers 104 and 106 are a part of an interior space that is divided into two parts by the piston head 92. In FIG. 15, an inlet/outlet port 130, for working chamber 106, is shown schematically. An inlet/outlet port 132 for working chamber 104 is also shown schematically. These ports 128,130,132 are shown differently and in more detail in FIGS. 14, 16 and 17.

Referring to FIG. 15, divider wall 100 includes a center passageway 134. The wall defining passageway 134 includes an annular groove 136 which receives an annular O-ring 138, for sealing against fluid leakage between the passageway sidewall and the piston 38. Piston head 92 includes an annular groove 140 which receives an annular O-ring 142. O-ring 142 seals against leakage between the piston head 92 and the inner surface 144 of working chamber 106. In this embodiment, the locking piston is designated 146. It has a first diameter part 148 that is sized to snugly slide along the piston rod 38. It also has a larger diameter second portion 150 which slides on a member 152 that is a part of the divider wall 100. Locking piston part 150 includes an annular groove 154 in which there is situated an annular O-ring 156. O-ring 156 seals against leakage between locking piston 146 and member 152. A shoulder is formed where locking piston portion 146 meets locking piston portion 150. This shoulder includes a piston face 158. The region of piston face 158 is surrounded by an annular chamber 160. In the axial direction, on each side of chamber 160, the center wall 100 includes annular grooves 162,164 respectively. Annular O-rings 166, 168 are received in these grooves. These seal rings 166, 168 seal against leakage out from chamber 160, between the opening in divider wall 100 and the outer surfaces of the locking piston 146.

Divider wall 100 includes a first spring abutment 170. Locking piston 146 includes a second spring abutment 172. A compression spring 174 is positioned within working chamber 104 between abutments 170, 172. Spring 174 normally biases the locking piston 146 towards the lock position of the actuator. Piston head 92 includes a plurality of lock bolt sockets 176. The lock bolt sockets 176 extend radially and are spaced circumferentially about the piston head 92. A separate lock bolt 178 is positioned within each lock bolt cavity 176. The lock bolts 178 are at times movable radially inwardly or outwardly. An annular lock bolt cavity 180 is formed in the sidewall of cylinder body 94. Lock bolts 178 include extend cams 182 and retract cams 184. Port 128 communicates with a passageway 186 which in turn communicates with an annular chamber 188. Chamber 188 is connected by passageway 190 to working chamber 160. Referring to FIG. 15, when the actuator is locked, working chamber 160 is connected to return pressure via passageway 190, chamber 180, passageway 186 and port 128. Spring 174 biases the locking piston 146 towards piston head 92, and places bolt block 183 in a position radially inwardly of the lock bolts 178. The lock bolts 178 are at their outer ends within lock bolt cavity 180. In this position the lock bolts 170 lock or secure the piston rod 38 and the piston head 92 against movement relative to the cylinder body 94. When it is desired to release or unlock the lock mechanism, fluid pressure is introduced into port 128. This fluid pressure enters into the working chamber 160 and is exerted against the piston surface 158. An endwise force is developed on the locking piston 146, in a direction opposite the force provided by spring 174. The fluid pressure moves the locking piston 146, to the left (as pictured)

and moves bolt block 183 out from a position radially inwardly of the lock bolts 178. Once bolt block 183 is out from a position radially inwardly of the lock bolts 178, the lock bolts 178 are free for radial inward movement, either under influence of the force of gravity or a mechanical force imposed on them. As earlier described, the upper lock bolts 178 might fall radially inwardly under the force of gravity. The lower lock bolts 178 must be pushed inwardly. If the upper lock bolts 178 "stick", they will also have to be pushed inwardly.

Once the lock mechanism is unlocked, hydraulic pressure is introduced into working chamber 104 via port 132. The pressure acting on piston head 92 moves the piston head 92 and the piston rod 38 to the right (as illustrated). The lock bolts 178 will not prevent this movement. The retract cams 184 are against cam surface 190 that is an axial sidewall of the lock bolt cavity 180. These cam surfaces 184, 190 coact to force or cam the lock bolts 178 radially inwardly in response to axial movement of the piston head 92. The lock bolts 178 will move inwardly until their outer ends clear sidewall 144. Then, the piston head 92 moves through working chamber 104, with the lock bolts 178 fully retracted (FIG. 17).

With respect to FIGS. 8–13, 18 and 19, it was stated that prior to unlocking, fluid pressure was introduced into working chamber WC1, WC1' for the purpose of moving the piston head PH tight against the shoulder 50. This was done for the purpose of unloading the lock bolts LB so that they could be retracted without a load on them, acting axially of the actuator. In the preferred embodiment, piston head 90 is over against cylinder head 98 when the actuator is in its "lock" position. Prior to "unlocking", fluid pressure is increased in working chambers 102 and 106, to pressure load the piston assembly 38, 90, 92 to the left (as illustrated). This moves piston head 90 tight against cylinder head 98 and "unloads" the lock bolts 178. That is, side loads on the lock bolts 178, caused by contact between surfaces 184, 190 are removed. The release of these forces remove friction forces from between the side surfaces of the lock bolts 178 and the adjoining side surfaces of the lock bolt sockets 176.

Figure 16:
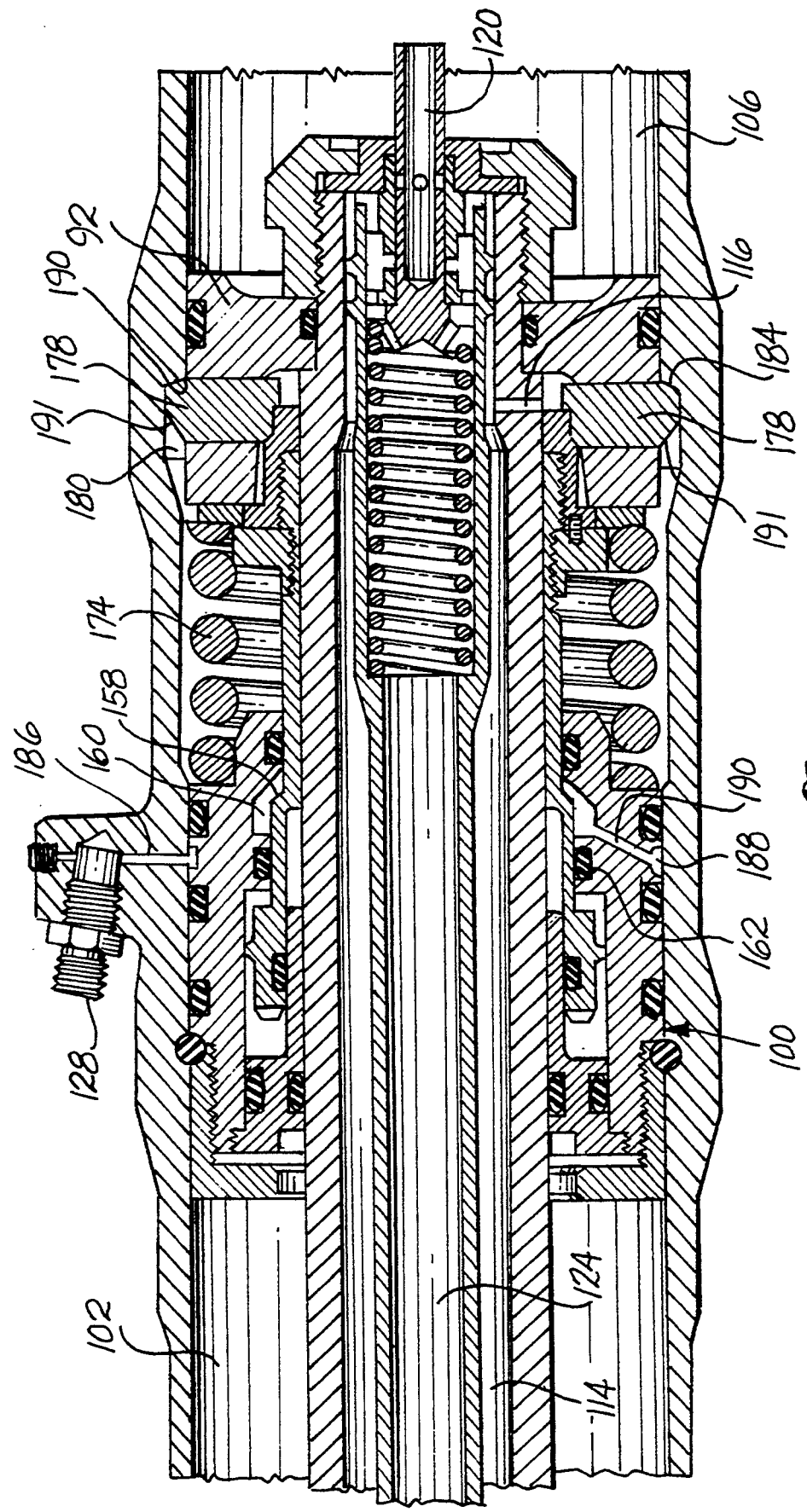
FIG. 16 is a view like FIG. 15 but showing details of the preferred embodiment which have been omitted from FIG. 15.
Figure 17:
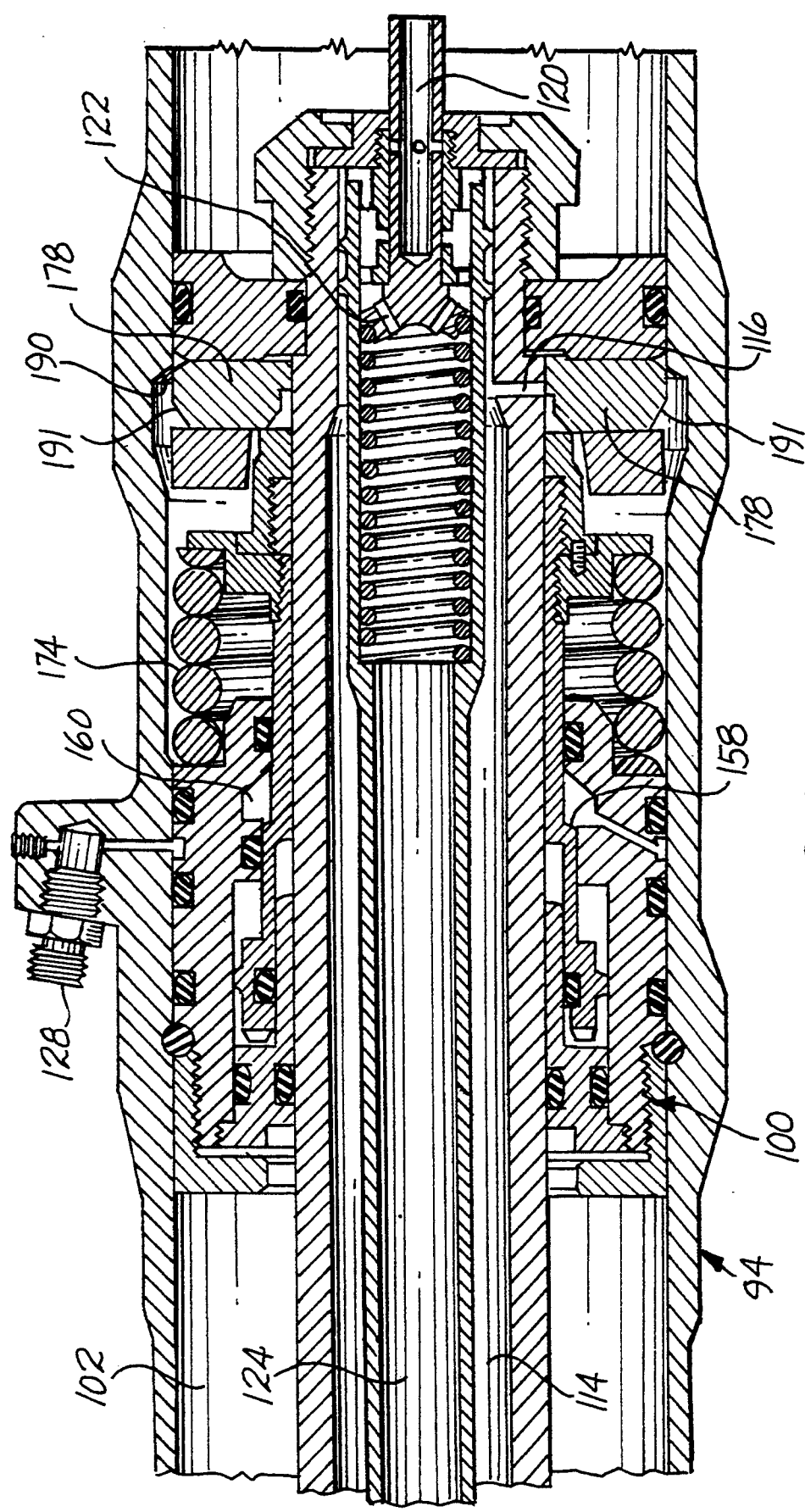
FIG. 17 is a view like FIG. 16, but showing the actuator in an unlocked position.

Referring to FIGS. 16 and 17, the separator wall 100 may be constructed from several parts, as illustrated. These parts may comprise a main body part, an end part and an inner part. The inner part may be thread connected to the main body part. The end part may be thread connected to the main body part. Seal ring grooves and seal rings may be provided, as illustrated. Locking piston 146 may also be constructed from several parts. In the illustrated embodiment, these include a main body part, a spring retainer part and an end part. Referring to the right end (as illustrated) of the piston rod 38, piston head 92 may be held in place by a nut. Tubular member, fittings and spring are a part of a "snubber" that is not a part of the present invention. For this reason, these parts will not be described. Hydraulic fluid enters passageway 120 and moves it against the spring. Fluid flows through the radial ports into passageway 124 and onto part 126 and working chamber 102.

An important feature of the invention is the use of a dedicated unlock port. This port is designated 83 in FIGS. 8 and 10, 128 in FIGS. 14 and 15, and 83 in FIGS. 18 and 19. Another important feature is the operation sequence in which the actuator is unloaded prior to unlocking. This is accomplished by (1) applying extend pressure, (2) applying unlock pressure through the dedicated unlock port, (3) removing extend pressure, and (4) applying retract pressure. By applying extend pressure first, even external loads on the actuator are reduced or eliminated during the unlock sequence. As will be appreciated, the pressure sequence is reversed for an actuator which is locked at the fully retracted position. When the actuator is used in a thrust reverser system the actuator lock is on the fully retracted end of the stroke. The addition of the unlock port prevents deployment unless unlock pressure is high. This could constitute a third level of safety that would prevent uncommanded deployment of the reverser. The unlock port requires a dedicated unlock control pressure which would prevent deployment due to the inadvertent "deploy" pressure command.

The invention is not to be limited to the details of the illustrated embodiments. Rather, coverage is to be determined by the claims which follow, construed in accordance with the rules of patent claim construction, including use of the doctrine of equivalents.

What is claimed is:

1. A hydraulic actuator, comprising:
an elongated cylinder body including a sidewall and end walls together defining an interior space;
a piston including a piston head within said interior space, said piston head dividing the interior space into two working chambers, one on each side of the piston head, each working chamber adapted to communicate with a pressure source for moving the piston axially within the cylinder body; and
a releasable lock for locking the piston in position relative to the cylinder body, said releasable lock comprising:
at least one radially extendible/retractable lock bolt carried by said piston head, said lock bolt being normally freed for retraction;
a complementary lock-bolt cavity within the cylinder body, and
a locking piston including a bolt block,
wherein said actuator includes a lock position in which it is desired to lock the piston to the cylinder body, and wherein when the actuator is in such lock position, the lock bolt is extendible radially outwardly into the lock-bolt cavity, and the locking piston is movable axially of the actuator to place the bolt block radially inwardly of the lock bolt, to in such position block the lock bolt against a radial inward movement out from the lock-bolt cavity, the locking piston being axially movable by means of a pressure source separately controllable from the pressure source in communication with the two working chambers.

2. A hydraulic actuator according to claim 1, wherein said locking piston includes a piston face against which hydraulic fluid may be directed, to move the locking piston axially, for retracting the bolt block out from its position radially inwardly of the lock bolt, so that the lock bolt is free to move radially inwardly, out from the lock-bolt cavity.

3. A hydraulic actuator according to claim 1, comprising a plurality of said lock bolts distributed circumferentially about the piston head, each said lock bolt being extendible radially into and retractable radially out from a lock-bolt cavity.

4. A hydraulic actuator according to claim 1, comprising a bias spring for said locking piston, wherein when the actuator is in the lock position, the bias spring biases the locking piston into a position placing the bolt block radially inwardly of the lock bolt.

5. A hydraulic actuator according to claim 4, wherein the lock bolt includes an extend cam positioned to, in response to the locking piston and the piston head being moved relatively together, be contacted by the bolt block, and wherein said extend cam is adapted to, in response to such movement and contact, cam the lock bolt radially outwardly into the lock-bolt cavity, and wherein said camming is followed by an axial movement of the bolt block into a position radially inwardly of the lock bolt.

6. A hydraulic actuator according to claim 1, wherein the lock bolt has a retract cam positioned to cam the lock bolt radially inwardly, out from the lock-bolt cavity, in response to an axial movement of the piston head relative to the cylinder body, following a retraction of the bolt block out from its position radially inwardly of the lock bolt.

7. A hydraulic actuator according to claim 1, wherein the actuator is in its lock position when extended, and when in said lock position, the lock bolt and the lock-bolt cavity are in radial alignment and the lock bolt is movable radially outwardly into the lock-bolt cavity, for locking the piston to the cylinder body.

8. A hydraulic actuator according to claim 1, wherein the actuator is in its lock position when retracted, and when in said lock position, the lock bolt and the lock-bolt cavity are in radial alignment and the lock bolt is movable radially outwardly into the lock bolt cavity, for locking the piston to the cylinder body.

9. A hydraulic actuator according to claim 1, wherein the bolt block is an annular first end portion of the locking piston, wherein said piston head includes a complementary annular passageway confronting said bolt block, and wherein relative movement of the bolt block into said annular passageway moves the bolt block into its position radially inwardly of the lock bolt.

10. A hydraulic actuator according to claim 9, wherein the lock bolt includes an extend cam positioned to be contacted by bolt block as the locking piston and piston head are moved relatively together, and wherein said extend cam is positioned to in response to such movement and contact cam the lock bolt radially outwardly into the lock-bolt cavity.

11. A hydraulic actuator according to claim 1, comprising a bias spring for said locking piston, wherein when the actuator is in its lock position, the bias spring biases the locking piston into a position placing the bolt block radially inwardly of the lock bolt, and wherein said locking piston includes a piston face against which a motive fluid may be directed, to move the locking piston axially against the bias spring, for retracting the bolt block out from its position radially inwardly of the lock bolt, so that the lock bolt is free to move radially inwardly, out from the lock-bolt cavity.

12. A hydraulic actuator according to claim 11, wherein the bolt block is an annular first end portion of the locking piston, wherein said piston head includes a complementary annular passageway confronting said bolt block, and wherein relative movement of the bolt into said annular passageway moves the bolt block into a position radially inwardly of the lock bolt.

13. A hydraulic actuator according to claim 12, wherein the locking piston includes a generally annular second end portion, and said cylinder body includes a working chamber end wall with a complementary annular second passageway in which the annular second end portion of the locking piston is received, said actuator including a seal between said second passageway and said annular second end portion of the locking piston.

14. A hydraulic actuator according to claim 11, wherein the lock bolt has a retract cam positioned to cam the lock bolt radially inwardly into a retracted position, in response to an axial movement of the piston head relative to the bolt block following a retraction of the bolt block from its position radially inwardly of the lock bolt.

15. A hydraulic actuator according to claim 14, wherein the lock bolt includes an extend cam positioned to be contacted by the bolt block, as the locking piston and piston head are moved relatively together, and wherein said extend cam is positioned to in response to such movement and contact cam the lock bolt radially outwardly into the lock-bolt cavity.

16. A hydraulic actuator according to claim 15, wherein the actuator is in its lock position when extended, and when in said position, the lock bolt and the lock-bolt cavity are in radial alignment and the lock bolt is movable radially outwardly into the lock-bolt cavity, for locking the piston to the cylinder body.

17. A hydraulic actuator according to claim 15, wherein the actuator is in its locked position when retracted, and when in said position the lock bolt and the lock-bolt cavity are in radial alignment, and the lock bolt is movable radially outwardly into the lock-bolt cavity, for locking the piston to the cylinder body.

18. A hydraulic actuator according to claim 1, wherein said cylinder body includes a shoulder, and wherein a portion of the piston head is substantially against said shoulder when the actuator is in a lock position, and wherein the lock bolt is substantially unloaded when the piston head is against such shoulder, enabling the bolt block to be retracted out from its position radially inwardly of the lock bolt when the lock bolt is unloaded.

19. A hydraulic actuator according to claim 17, wherein said locking piston includes a piston face against which hydraulic fluid may be directed, to move the locking piston axially, for retracting the bolt block out from its position radially inwardly of the lock bolt, so that the lock bolt is free to move radially inwardly, out from the lock-bolt cavity.

20. A hydraulic actuator according to claim 19, comprising a bias spring for said locking piston, wherein when the actuator is in its lock position, the bias spring biases the blocking piston into a position placing the bolt block radially inwardly of the lock-bolt.

21. An airplane, comprising:
  a fuselage and a pair of wings projecting laterally outwardly on opposite sides of the fuselage, each wing having an inboard main portion connected to the fuselage and an outboard tip portion which is movable between an in use position in which it is an outboard continuation of the inboard portion of the wing and a folded position in which it extends generally vertically upwardly from the inboard portion of the wing; and
  a hydraulic actuator for moving the outboard tip portion of the wing between its spread and folded positions, comprising:
  an elongated cylinder body including a sidewall and end walls together defining an interior space;

a piston including a piston head within said interior space, said piston head dividing the interior space into two working chambers, one on each side of the piston head, each working chamber adapted to communicate with a hydraulic pressure source for moving said piston axially Within the cylinder body; and a releasable lock for locking the piston in position relative to the cylinder body, said releasable lock comprising:

at least one radially extendible/retractable lock bolt carried by said piston head, said lock bolt being normally freed for retraction;

a complementary lock-bolt cavity within the cylinder body, and a locking piston including a bolt block, wherein said actuator includes a lock position in which it is desired to lock the piston to the cylinder body, and wherein when the actuator is in such lock position, the lock bolt is extendible radially outwardly into the lock-bolt cavity, and the locking piston is movable axially of the actuator to place the bolt block radially inwardly of the lock bolt, to in such position block the lock bolt against a radial inward movement out from the lock-bolt cavity, the locking piston being axially movable by means of a pressure source separately controllable from the pressure source in communication with the two working chambers.

22. A hydraulic actuator according to claim 21, wherein said locking piston includes a piston face against which hydraulic fluid may be directed, to move the locking piston axially, for retracting the bolt block out from its position radially inwardly of the lock bolt, so that the lock bolt is free to move radially inwardly, out from the lock-bolt cavity.

23. A hydraulic actuator according to claim 21, comprising a plurality of said lock bolts distributed circumferentially about the piston head, each said lock bolt being extendible radially into and retractable radially out from a lock-bolt cavity.

24. A hydraulic actuator according to claim 21, comprising a bias spring for said locking piston, wherein when the actuator is in the lock position, the bias spring biases the locking piston into a position placing the bolt block radially inwardly of the lock bolt.

25. A hydraulic actuator according to claim 24, wherein the lock bolt includes an extend cam positioned to, in response to the locking piston and the piston head being moved relatively together, be contacted by the bolt block, and wherein said extend cam is adapted to, in response to such movement and contact, cam the lock bolt radially outwardly into the lock-bolt cavity, and wherein said camming is followed by an axial movement of the bolt block into a position radially inwardly of the lock bolt.

26. A hydraulic actuator according to claim 25, wherein the lock bolt has a retract cam positioned to cam the lock bolt radially inwardly, out from the lock-bolt cavity, in response to an axial movement of the piston head relative to the cylinder body, following a retraction of the bolt block out from its position radially inwardly of the lock bolt.

27. A hydraulic actuator according to claim 21, wherein the actuator is in its lock position when extended, and when in said lock position, the lock bolt and the lock-bolt cavity are in radial alignment and the lock bolt is movable radially outwardly into the lock-bolt cavity, for locking the piston to the cylinder body.

28. A hydraulic actuator according to claim 21, wherein the actuator is in its lock position when retracted, and when in said lock position, the lock bolt and the lock-bolt cavity are in radial alignment and the lock bolt is movable radially outwardly into the lock bolt cavity, for locking the piston to the cylinder body.

29. A hydraulic actuator according to claim 21, wherein the bolt block is an annular first end portion of the locking piston, wherein said piston head includes a complementary annular passageway confronting said bolt block, and wherein relative movement of the bolt block into said annular passageway moves the bolt block into its position radially inwardly of the lock bolt.

30. A hydraulic actuator according to claim 29, wherein the lock bolt includes an extend cam positioned to be contacted by bolt block as the locking piston and piston head are moved relatively together, and wherein said extend cam is positioned to in response to such movement and contact cam the lock bolt radially outwardly into the lock-bolt cavity.

31. A hydraulic actuator according to claim 21, comprising a bias spring for said locking piston, wherein when the actuator is in its lock position, the bias spring biases the locking piston into a position placing the bolt block radially inwardly of the lock bolt, and wherein said locking piston includes a piston face against which a motive fluid may be directed, to move the locking piston axially against the bias spring, for retracting the bolt block out from its position radially inwardly of the lock bolt, so that the lock bolt is free to move radially inwardly, out from the lock-bolt cavity.

32. A hydraulic actuator according to claim 21, wherein the bolt block is an annular first end portion of the locking piston, wherein said piston head includes a complementary annular passageway confronting said bolt block, and wherein relative movement of the bolt into said annular passageway moves the bolt block into a position radially inwardly of the lock bolt.

33. A hydraulic actuator according to claim 32, wherein the locking piston includes a generally annular second end portion, and said cylinder body includes a working chamber end wall with a complementary annular second passageway in which the annular second end portion of the locking piston is received, said actuator including a seal between said second passageway and said annular second end portion of the locking piston.

34. A hydraulic actuator according to claim 31, wherein the lock bolt has a retract cam positioned to cam the lock bolt radially inwardly into a retracted position, in response to an axial movement of the piston head relative to the bolt block following a retraction of the bolt block from its position radially inwardly of the lock bolt.

35. A hydraulic actuator according to claim 34, wherein the lock bolt includes an extend cam positioned to be contacted by the bolt block, as the locking piston and piston head are moved relatively together, and wherein said extend cam is positioned to in response to such movement and contact cam the lock bolt radially outwardly into the lock-bolt cavity.

36. A hydraulic actuator according to claim 35, wherein the actuator is in its lock position when extended, and when in said position, the lock bolt and the lock-bolt cavity are in radial alignment and the lock bolt is movable radially outwardly into the lock-bolt cavity, for locking the piston to the cylinder body.

37. A hydraulic actuator according to claim 35, wherein the actuator is in its locked position when retracted, and when in said position the lock bolt and the lock-bolt cavity are in radial alignment, and the lock bolt is movable radially outwardly into the lock-bolt cavity, for locking the piston to the cylinder body.

38. A hydraulic actuator according to claim 21, wherein said cylinder body includes a shoulder, and wherein a portion of the piston head is substantially against said shoulder when the actuator is in a lock position, and wherein the lock bolt is substantially unloaded when the piston head is against such shoulder, enabling the bolt block to be retracted out from its position radially inwardly of the lock bolt when the lock bolt is unloaded.

39. A hydraulic actuator according to claim 37, wherein said locking piston includes a piston face against which hydraulic fluid may be directed, to move the locking piston axially, for retracting the bolt block out from its position radially inwardly of the lock bolt, so that the lock bolt is free to move radially inwardly, out from the lock-bolt cavity.

40. A hydraulic actuator according to claim 39, comprising a bias spring for said locking piston, wherein when the actuator is in its lock position, the bias spring biases the blocking piston into a position placing the bolt block radially inwardly of the lock-bolt.

41. A hydraulic actuator, comprising:
an elongated cylinder body including a sidewall and end walls together defining an interior space;
a piston including a piston head within said interior space, said piston head dividing the interior space into two working chambers, one on each side of the piston head; and
a releasable lock for locking the piston in position relative to the cylinder body, said releasable lock comprising:
at least one radially extendible/retractable lock bolt carried by said piston head, said lock bolt being normally freed for retraction;
a complementary lock-bolt cavity within the cylinder body, and
a locking piston including a bolt block,
wherein said actuator includes a lock position in which it is desired to lock the piston to the cylinder body, and wherein when the actuator is in such lock position, the lock bolt is extendible radially outwardly into the lock-bolt cavity, and the locking piston is movable axially of the actuator to place the bolt block radially inwardly of the lock bolt, to in such position block the lock bolt against a radial inward movement out from the lock-bolt cavity; and
wherein the bolt block is an annular first end portion of the locking piston, wherein said piston head includes a complementary annular passageway confronting said bolt block, and wherein relative movement of the bolt block into said annular passageway moves the bolt block into its position radially inwardly of the lock bolt.

42. A hydraulic actuator according to claim 41, wherein the lock bolt includes an extend cam positioned to be contacted by bolt block as the locking piston and piston head are moved relatively together, and wherein said extend cam is positioned to in response to such movement and contact cam the lock bolt radially outwardly into the lock-bolt cavity.

43. A hydraulic actuator according to claim 41, comprising a bias spring for said locking piston, wherein when the actuator is in its lock position, the bias spring biases the locking piston into a position placing the bolt block radially inwardly of the lock bolt, and wherein said locking piston includes a piston face against which a motive fluid may be directed, to move the locking piston axially against the bias spring, for retracting the bolt block out from its position radially inwardly of the lock bolt, so that the lock bolt is free to move radially inwardly, out from the lock-bolt cavity.

44. A hydraulic actuator according to claim 43, wherein the bolt block is an annular first end portion of the locking piston, wherein said piston head includes a complementary annular passageway confronting said bolt block, and wherein relative movement of the bolt into said annular passageway moves the bolt block into a position radially inwardly of the lock bolt.

45. A hydraulic actuator according to claim 44, wherein the locking piston includes a generally annular second end portion, and said cylinder body includes a working chamber end wall with a complementary annular second passageway in which the annular second end portion of the locking piston is received, said actuator including a seal between said second passageway and said annular second end portion of the locking piston.

46. A hydraulic actuator according to claim 43, wherein the lock bolt has a retract cam positioned to cam the lock bolt radially inwardly into a retracted position, in response to an axial movement of the piston head relative to the bolt block following a retraction of the bolt block from its position radially inwardly of the lock bolt.

47. A hydraulic actuator according to claim 46, wherein the lock bolt includes an extend cam positioned to be contacted by the bolt block, as the locking piston and piston head are moved relatively together, and wherein said extend cam is positioned to in response to such movement and contact cam the lock bolt radially outwardly into the lock-bolt cavity.

48. A hydraulic actuator according to claim 47, wherein the actuator is in its look position when extended, and when in said position, the lock bolt and the lock-bolt cavity are in radial alignment and the lock bolt is movable radially outwardly into the lock-bolt cavity, for locking the piston to the cylinder body.

49. A hydraulic actuator according to claim 47, wherein the actuator is in its locked position when retracted, and when in said position the lock bolt and the lock-bolt cavity are in radial alignment, and the lock bolt is movable radially outwardly into the lock-bolt cavity, for locking the piston to the cylinder body.

50. An airplane, comprising:
a fuselage and a pair of wings projecting laterally outwardly on opposite sides of the fuselage, each wing having an inboard main portion connected to the fuselage and an outboard tip portion which is movable between an in use position in which it is an outboard continuation of the inboard portion of the wing and a folded position in which it extends generally vertically upwardly from the inboard portion of the wing; and
a hydraulic actuator for moving the outboard tip portion of the wing between its spread and folded positions, comprising:

an elongated cylinder body including a sidewall and end walls together defining an interior space;

a piston including a piston head within said interior space, said piston head dividing the interior space into two working chambers, one on each side of the piston head; and a releasable lock for locking the piston in position relative to the cylinder body, said releasable lock comprising:

at least one radially extendible/retractable lock bolt carried by said piston head, said lock bolt being normally freed for retraction;

a complementary lock-bolt cavity within the cylinder body, and a locking piston including a bolt block, wherein said actuator includes a lock position in which it is desired to lock the piston to the cylinder body, and wherein when the actuator is in such lock position, the lock bolt is extendible radially outwardly into the lock-bolt cavity, and the locking piston is movable axially of the actuator to place the bolt block radially inwardly of the lock bolt, to in such position block the lock bolt against a radial inward movement out from the lock-bolt cavity; and wherein the bolt block is an annular first end portion of the locking piston, wherein said piston head includes a complementary annular passageway confronting said bolt block, and wherein relative movement of the bolt block into said annular passageway moves the bolt block into its position radially inwardly of the lock bolt.

51. A hydraulic actuator according to claim 50, wherein the lock bolt includes an extend cam positioned to be contacted by bolt block as the locking piston and piston head are moved relatively together, and wherein said extend cam is positioned to in response to such movement and contact cam the lock bolt radially outwardly into the lock-bolt cavity.

52. A hydraulic actuator according to claim 50, wherein the bolt block is an annular first end portion of the locking piston, wherein said piston head includes a complementary annular passageway confronting said bolt block, and wherein relative movement of the bolt into said annular passageway moves the bolt block into a position radially inwardly of the lock bolt.

53. A hydraulic actuator according to claim 52, wherein the locking piston includes a generally annular second end portion, and said cylinder body includes a working chamber end wall with a complementary annular second passageway in which the annular second end portion of the locking piston is received, said actuator including a seal between said second passageway and said annular second end portion of the locking piston.

54. A hydraulic actuator according to claim 50, comprising a bias spring for said locking piston, wherein when the actuator is in its lock position, the bias spring biases the locking piston into a position placing the bolt block radially inwardly of the lock bolt, and wherein said locking piston includes a piston face against which a motive fluid may be directed, to move the locking piston axially against the bias spring, for retracting the bolt block out from its position radially inwardly of the lock bolt, so that the lock bolt is free to move radially inwardly, out from the lock-bolt cavity.

55. A hydraulic actuator according to claim 54, wherein the lock bolt has a retract cam positioned to cam the lock bolt radially inwardly into a retracted position, in response to an axial movement of the piston head relative to the bolt block following a retraction of the bolt block from its position radially inwardly of the lock bolt.

56. A hydraulic actuator according to claim 55, wherein the lock bolt includes an extend cam positioned to be contacted by the bolt block, as the locking piston and piston head are moved relatively together, and wherein said extend cam is positioned to in response to such movement and contact cam the lock bolt radially outwardly into the lock-bolt cavity.

57. A hydraulic actuator according to claim 56, wherein the actuator is in its lock position when extended, and when in said position, the lock bolt and the lock-bolt cavity are in radial alignment and the lock bolt is movable radially outwardly into the lock-bolt cavity, for locking the piston to the cylinder body.

58. A hydraulic actuator according to claim 56, wherein the actuator is in its locked position when retracted, and when in said position the lock bolt and the lock-bolt cavity are in radial alignment, and the lock bolt is movable radially outwardly into the lock-bolt cavity, for locking the piston to the cylinder body.

59. A hydraulic actuator, comprising:

an elongated cylinder body including a sidewall and end walls together defining an interior space;

a piston including a piston head within said interior space, said piston head dividing the interior space into two working chambers, one on each side of the piston head; and a releasable lock for locking the piston in position relative to the cylinder body, said releasable lock comprising:

at least one radially extendible/retractable lock bolt carried by said piston head, said lock bolt being normally freed for retraction;

a complementary lock-bolt cavity within the cylinder body, and a locking piston including a bolt block, wherein said actuator includes a lock position in which it is desired to lock the piston to the cylinder body, and wherein when the actuator is in such lock position, the lock bolt is extendible radially outwardly into the lock-bolt cavity, and the locking piston is movable axially of the actuator to place the bolt block radially inwardly of the lock bolt, to in such position block the lock bolt against a radial inward movement out from the lock-bolt cavity; and wherein said cylinder body includes a shoulder, wherein said cylinder body includes a shoulder and wherein a portion of the piston head is substantially against said shoulder when the actuator is in a lock position, and wherein the lock bolt is substantially unloaded when the piston head is against such shoulder, enabling the bolt block to be retracted out from its position radially inwardly of the lock bolt when the lock bolt is unloaded.

60. A hydraulic actuator according to claim 59, wherein said locking piston includes a piston face against which hydraulic fluid may be directed, to move the locking piston axially, for retracting the bolt block out from its position radially inwardly of the lock bolt, so that the lock bolt is free to move radially inwardly, out from the lock-bolt cavity.

61. A hydraulic actuator according to claim 60, comprising a bias spring for said locking piston, wherein when the actuator is in its lock position, the bias spring biases the blocking piston into a position placing the bolt block radially inwardly of the lock-bolt.

62. A hydraulic actuator according to claim 1, wherein said locking piston includes a piston face against which hydraulic fluid may be directed, to move the locking piston axially, the piston face, the locking piston, and the cylinder body defining a third working chamber sealed from the first two working chambers, the third working chamber being in fluid communication with the separate pressure source.

63. A hydraulic actuator according to claim 62, wherein the cylinder body includes a radial abutment that engages said locking piston and separates the third working chamber from the other two working chambers.

64. A hydraulic actuator according to claim 9, wherein the piston includes a piston rod extending from said piston head, and the locking piston is an annular piece surrounding the piston rod.

65. A hydraulic actuator according to claim 21, wherein said locking piston includes a piston face against which hydraulic fluid may be directed, to move the locking piston axially, the piston face, locking piston, and cylinder body defining a third working chamber sealed from the first two working chambers, the third working chamber being in fluid communication with the separate pressure source.

66. A hydraulic actuator according to claim 65, wherein the cylinder body includes a radial abutment that engages said locking piston and separates the third working chamber from the other two working chambers.

* * * * *